(12) United States Patent
Wyner et al.

(10) Patent No.: US 9,770,642 B2
(45) Date of Patent: Sep. 26, 2017

(54) FLEXIBLE CUSHIONING PADS, ITEMS INCORPORATING SUCH PADS, AND METHODS OF MAKING AND USING

(71) Applicant: G-Form, LLC, Providence, RI (US)

(72) Inventors: Daniel M. Wyner, North Scituate, RI (US); Richard B. Fox, Smithfield, RI (US); Thomas Cafaro, Foster, RI (US); Stephanie Thorn, Chepachet, RI (US); Ami Newsham, Providence, RI (US); David Foster, Swansea, MA (US)

(73) Assignee: G-Form, LLC, Providence, RI (US)

( * ) Notice: Subject to any disclaimer, the term of this patent is extended or adjusted under 35 U.S.C. 154(b) by 0 days.

(21) Appl. No.: 15/208,581

(22) Filed: Jul. 12, 2016

(65) Prior Publication Data

US 2016/0316828 A1    Nov. 3, 2016

Related U.S. Application Data

(63) Continuation of application No. 13/208,229, filed on Aug. 11, 2011.

(Continued)

(51) Int. Cl.
*A63B 71/08* (2006.01)
*B32B 5/18* (2006.01)
(Continued)

(52) U.S. Cl.
CPC ............ *A63B 71/08* (2013.01); *A41D 13/015* (2013.01); *A41D 13/0153* (2013.01);
(Continued)

(58) Field of Classification Search
CPC .. A41D 13/06; A41D 13/065; A41D 13/0543; A63B 71/12; A63B 71/1225
See application file for complete search history.

(56) References Cited

U.S. PATENT DOCUMENTS

| 822,138 A | 5/1906 | Little |
| 1,462,534 A | 7/1923 | Condylis et al. |

(Continued)

FOREIGN PATENT DOCUMENTS

| CA | 2120178 A1 | 3/1994 |
| CN | 1250354 | 4/2000 |

(Continued)

OTHER PUBLICATIONS

International Search Report in International Application No. PCT/US2013/023480 dated Apr. 9, 2013.

(Continued)

*Primary Examiner* — Shaun R Hurley
*Assistant Examiner* — Andrew W Sutton
(74) *Attorney, Agent, or Firm* — Greenberg Traurig, LLP; Roman Fayerberg

(57) ABSTRACT

Disclosed herein are conformable protection pads, which can be integrated into articles such as clothing and protective cases. An exemplary cushioning pad can include an upper layer and a lower layer and cushioning material therebetween in a first cushioning region and one or more second cushioning regions, and one or more grooves between the first cushioning region and the second cushioning regions to enable articulation of the second cushioning regions relative to the first cushioning region.

30 Claims, 17 Drawing Sheets

Related U.S. Application Data

(60) Provisional application No. 61/401,373, filed on Aug. 11, 2010, provisional application No. 61/382,022, filed on Sep. 12, 2010, provisional application No. 61/404,906, filed on Oct. 12, 2010, provisional application No. 61/412,767, filed on Nov. 11, 2010.

(51) Int. Cl.

| | | |
|---|---|---|
| B32B 5/24 | (2006.01) | |
| B32B 27/06 | (2006.01) | |
| B32B 27/40 | (2006.01) | |
| B32B 5/22 | (2006.01) | |
| B32B 3/00 | (2006.01) | |
| B32B 3/20 | (2006.01) | |
| B32B 3/26 | (2006.01) | |
| B32B 3/30 | (2006.01) | |
| A41D 13/015 | (2006.01) | |
| A41D 13/06 | (2006.01) | |
| B32B 5/02 | (2006.01) | |
| A41D 13/05 | (2006.01) | |
| A41D 13/08 | (2006.01) | |
| B32B 9/02 | (2006.01) | |
| B32B 15/04 | (2006.01) | |
| B32B 27/20 | (2006.01) | |
| B32B 27/30 | (2006.01) | |
| B32B 27/32 | (2006.01) | |
| B32B 27/34 | (2006.01) | |
| B32B 27/36 | (2006.01) | |
| B32B 29/00 | (2006.01) | |
| A63B 71/12 | (2006.01) | |

(52) U.S. Cl.
CPC ...... *A41D 13/0512* (2013.01); *A41D 13/0518* (2013.01); *A41D 13/06* (2013.01); *A41D 13/065* (2013.01); *A41D 13/08* (2013.01); *B32B 3/00* (2013.01); *B32B 3/20* (2013.01); *B32B 3/263* (2013.01); *B32B 3/30* (2013.01); *B32B 5/02* (2013.01); *B32B 5/022* (2013.01); *B32B 5/024* (2013.01); *B32B 5/026* (2013.01); *B32B 5/18* (2013.01); *B32B 5/22* (2013.01); *B32B 5/24* (2013.01); *B32B 5/245* (2013.01); *B32B 9/025* (2013.01); *B32B 15/04* (2013.01); *B32B 27/065* (2013.01); *B32B 27/20* (2013.01); *B32B 27/30* (2013.01); *B32B 27/302* (2013.01); *B32B 27/304* (2013.01); *B32B 27/306* (2013.01); *B32B 27/32* (2013.01); *B32B 27/322* (2013.01); *B32B 27/34* (2013.01); *B32B 27/36* (2013.01); *B32B 27/40* (2013.01); *B32B 29/002* (2013.01); *A63B 2071/1208* (2013.01); *B32B 2262/0215* (2013.01); *B32B 2266/0278* (2013.01); *B32B 2274/00* (2013.01); *B32B 2307/546* (2013.01); *B32B 2307/558* (2013.01); *B32B 2307/56* (2013.01); *B32B 2307/5825* (2013.01); *B32B 2307/72* (2013.01); *B32B 2307/732* (2013.01); *B32B 2437/00* (2013.01); *B32B 2571/00* (2013.01)

(56) References Cited

U.S. PATENT DOCUMENTS

| | | |
|---|---|---|
| 1,596,347 A | 8/1926 | Gilowitz |
| 2,771,691 A | 11/1956 | Luchs |
| 3,772,704 A * | 11/1973 | Carbonneau ....... A63B 71/1225 2/22 |
| 3,921,222 A | 11/1975 | Hollman |
| 3,997,214 A | 12/1976 | Jacobs |
| 4,084,586 A | 4/1978 | Hettick |
| 4,292,735 A | 10/1981 | Thillays |
| 4,306,315 A | 12/1981 | Castiglia |
| 4,397,636 A | 8/1983 | Ganshaw |
| 4,471,538 A | 9/1984 | Pomeranz et al. |
| 4,476,858 A | 10/1984 | Curtis |
| 4,481,679 A | 11/1984 | Hayes |
| 4,602,384 A | 7/1986 | Schneider |
| 4,700,407 A | 10/1987 | Mattila |
| 4,751,748 A | 6/1988 | Ekins |
| 4,788,972 A | 12/1988 | Debusk |
| 4,989,266 A | 2/1991 | Borgese et al. |
| 5,007,108 A | 4/1991 | Laberge et al. |
| 5,007,111 A | 4/1991 | Adams |
| 5,052,053 A * | 10/1991 | Peart ................ A41D 13/012 2/2.16 |
| 5,108,076 A | 4/1992 | Chiarella |
| 5,168,576 A * | 12/1992 | Krent ................ A41D 13/0156 2/16 |
| 5,203,607 A | 4/1993 | Landi |
| 5,233,845 A | 8/1993 | D'Andrade |
| 5,282,326 A | 2/1994 | Schroer et al. |
| 5,419,161 A | 5/1995 | Bodenschatz et al. |
| 5,423,087 A | 6/1995 | Krent et al. |
| D360,285 S * | 7/1995 | Paffett ................. D29/121.1 |
| 5,443,883 A | 8/1995 | Park |
| 5,477,558 A * | 12/1995 | Volker ............. A41D 13/0153 2/16 |
| 5,477,559 A | 12/1995 | Clement |
| 5,497,511 A | 3/1996 | Zade |
| 5,551,082 A | 9/1996 | Stewart et al. |
| 5,594,954 A | 1/1997 | Huang |
| 5,599,290 A | 2/1997 | Hayes et al. |
| 5,611,080 A | 3/1997 | Skottheim |
| 5,619,748 A | 4/1997 | Nelson et al. |
| 5,636,377 A | 6/1997 | Wiener |
| 5,640,714 A | 6/1997 | Tanaka |
| 5,689,828 A | 11/1997 | Mah |
| 5,689,836 A | 11/1997 | Fee et al. |
| 5,713,143 A | 2/1998 | Kendall |
| 5,717,997 A | 2/1998 | Garcia |
| 5,720,518 A | 2/1998 | Harrison |
| 5,724,670 A | 3/1998 | Price |
| 5,789,327 A | 8/1998 | Rousseau |
| 5,796,028 A | 8/1998 | Field et al. |
| 5,819,312 A | 10/1998 | Snyder et al. |
| 5,829,073 A | 11/1998 | Lee |
| 5,834,273 A | 11/1998 | Futatsugi et al. |
| D406,407 S | 3/1999 | Popowski |
| 5,918,310 A | 7/1999 | Farahany |
| 5,921,945 A | 7/1999 | Gray |
| 5,926,842 A | 7/1999 | Price et al. |
| 5,943,706 A | 8/1999 | Miyajima et al. |
| 6,000,055 A | 12/1999 | Citterio |
| 6,007,149 A | 12/1999 | Yates |
| 6,030,035 A | 2/2000 | Yates |
| 6,065,152 A | 5/2000 | Parker |
| 6,079,056 A | 6/2000 | Fogelberg |
| 6,093,468 A * | 7/2000 | Toms ................. A41D 13/0158 2/22 |
| D430,362 S | 8/2000 | Pagotto |
| 6,103,641 A | 8/2000 | Gehring, Jr. |
| 6,131,734 A | 10/2000 | Hollingsworth et al. |
| 6,151,710 A | 11/2000 | Bachner, Jr. |
| 6,154,889 A | 12/2000 | Moore, III |
| 6,176,025 B1 | 1/2001 | Patterson et al. |
| 6,192,519 B1 | 2/2001 | Coalter |
| 6,195,809 B1 | 3/2001 | Garcia |
| 6,196,986 B1 | 3/2001 | Gardiner |
| 6,219,842 B1 | 4/2001 | Bachner, Jr. |
| 6,279,160 B1 | 8/2001 | Chen |
| 6,282,729 B1 | 9/2001 | Oikawa et al. |
| 6,289,524 B1 | 9/2001 | Wright et al. |
| 6,295,654 B1 * | 10/2001 | Farrell ............. A41D 13/0153 2/108 |
| 6,324,703 B1 | 12/2001 | Chen |
| 6,408,446 B1 | 6/2002 | Carrington |
| 6,422,647 B1 | 7/2002 | Turudich |

(56) References Cited

U.S. PATENT DOCUMENTS

| | | | |
|---|---|---|---|
| D463,886 S | 10/2002 | Cantu, Jr. | |
| 6,460,207 B1 | 10/2002 | Papay et al. | |
| D472,678 S | 4/2003 | Cho | |
| 6,547,327 B1 | 4/2003 | Yates | |
| 6,560,781 B1 | 5/2003 | Keene et al. | |
| 6,631,568 B2 | 10/2003 | Howlett et al. | |
| 6,701,529 B1 | 3/2004 | Rhoades et al. | |
| 6,729,164 B2 | 5/2004 | Shibata | |
| 6,786,126 B2 | 9/2004 | Sargent | |
| 6,820,279 B2 | 11/2004 | Lesosky | |
| 6,852,102 B1 | 2/2005 | Vernoy | |
| 6,859,948 B2 | 3/2005 | Melts | |
| 6,861,379 B1 | 3/2005 | Blaszczykiewicz | |
| D505,534 S | 5/2005 | Matechen | |
| 6,891,078 B1 | 5/2005 | Dillard | |
| 6,912,729 B2 | 7/2005 | Nishimoto | |
| 6,959,453 B2 * | 11/2005 | Best | A63B 71/143 2/161.1 |
| 6,976,321 B1 | 12/2005 | Lakic | |
| 7,000,253 B1 | 2/2006 | Kleinert | |
| 7,000,259 B2 | 2/2006 | Matechen | |
| 7,010,811 B1 | 3/2006 | Park | |
| D518,623 S | 4/2006 | Matechen | |
| 7,022,096 B1 | 4/2006 | Alfieri | |
| 7,096,508 B2 | 8/2006 | Lesosky | |
| 7,100,216 B2 * | 9/2006 | Matechen | A41D 13/0156 2/455 |
| 7,107,626 B1 | 9/2006 | Andrews | |
| 7,114,189 B1 * | 10/2006 | Kleinert | A41D 13/065 2/24 |
| 7,181,770 B2 | 2/2007 | Godshaw | |
| 7,300,893 B2 | 11/2007 | Barsoum et al. | |
| D566,484 S | 4/2008 | George | |
| 7,376,978 B2 | 5/2008 | Godshaw | |
| 7,381,460 B2 | 6/2008 | Palmer et al. | |
| D572,430 S | 7/2008 | Wong | |
| 7,451,493 B2 | 11/2008 | Godshaw | |
| D582,608 S | 12/2008 | Palmer | |
| 7,498,276 B2 | 3/2009 | Wagner et al. | |
| 7,500,274 B1 | 3/2009 | Kallen | |
| 7,516,562 B2 | 4/2009 | Signori | |
| D593,258 S | 5/2009 | Kamradt | |
| 7,530,182 B2 | 5/2009 | Munns | |
| D602,210 S | 10/2009 | Crye | |
| 7,601,654 B2 | 10/2009 | Bhatnagar et al. | |
| 7,622,405 B1 | 11/2009 | Arvidson et al. | |
| 7,637,884 B2 | 12/2009 | Nordt, III et al. | |
| 7,708,708 B2 | 5/2010 | Nordt, III et al. | |
| 7,757,307 B2 | 7/2010 | Wong | |
| 7,757,310 B2 | 7/2010 | Wong | |
| 7,794,827 B2 | 9/2010 | Palmer et al. | |
| D626,718 S | 11/2010 | Turner | |
| D626,719 S | 11/2010 | Turner | |
| 7,827,704 B2 | 11/2010 | Fox et al. | |
| 7,841,019 B2 | 11/2010 | Godshaw et al. | |
| D628,769 S | 12/2010 | Turner | |
| 7,845,017 B2 | 12/2010 | Godshaw et al. | |
| D630,385 S | 1/2011 | Bishop | |
| 7,874,239 B2 | 1/2011 | Howland | |
| 7,891,026 B1 | 2/2011 | Smith | |
| D633,279 S | 3/2011 | Turkbas | |
| D633,688 S | 3/2011 | Turner | |
| 7,917,971 B2 | 4/2011 | Kamradt | |
| 7,937,768 B2 | 5/2011 | Behrend et al. | |
| 7,958,812 B2 | 6/2011 | Wang et al. | |
| 8,015,617 B1 | 9/2011 | Carbajal et al. | |
| 8,039,078 B2 | 10/2011 | Moore, III et al. | |
| 8,065,753 B2 | 11/2011 | Sorensen et al. | |
| 8,091,963 B1 | 1/2012 | Wyner et al. | |
| 8,108,951 B2 | 2/2012 | Gabry et al. | |
| 8,124,548 B2 | 2/2012 | Ardiff et al. | |
| D656,278 S | 3/2012 | Saranga | |
| D656,685 S | 3/2012 | Best et al. | |
| 8,129,293 B2 | 3/2012 | Budden et al. | |
| 8,141,169 B2 | 3/2012 | Saranga | |
| 8,151,376 B2 | 4/2012 | Onrot et al. | |
| D663,072 S | 7/2012 | Best et al. | |
| D663,101 S | 7/2012 | Best et al. | |
| D663,102 S | 7/2012 | Hogg | |
| D663,484 S | 7/2012 | Best et al. | |
| D663,485 S | 7/2012 | Turkbas et al. | |
| D663,486 S | 7/2012 | Turkbas et al. | |
| D665,949 S | 8/2012 | Jourde | |
| D669,587 S | 10/2012 | Mayer | |
| 8,336,120 B2 | 12/2012 | Wong | |
| 8,408,114 B1 | 4/2013 | Tan | |
| D684,323 S | 6/2013 | Macrina et al. | |
| 8,499,987 B2 * | 8/2013 | Fidrych | A45F 3/12 224/264 |
| D693,064 S | 11/2013 | Dupree et al. | |
| 8,672,864 B2 | 3/2014 | Nordt, III et al. | |
| 8,726,424 B2 | 5/2014 | Thomas et al. | |
| D717,499 S | 11/2014 | Stauber | |
| 9,254,433 B2 | 2/2016 | Dodd | |
| 2001/0015022 A1 | 8/2001 | Singer et al. | |
| 2001/0045028 A1 | 11/2001 | Crane et al. | |
| 2001/0052146 A1 * | 12/2001 | Garneau | A41D 1/084 2/455 |
| 2002/0092199 A1 | 7/2002 | Fish et al. | |
| 2002/0092203 A1 | 7/2002 | Hardt | |
| 2002/0139009 A1 | 10/2002 | Mark | |
| 2003/0070321 A1 | 4/2003 | Davis et al. | |
| 2003/0121180 A1 | 7/2003 | Poe et al. | |
| 2003/0136025 A1 | 7/2003 | Galbraith et al. | |
| 2003/0167548 A1 | 9/2003 | LaShoto et al. | |
| 2003/0188373 A1 * | 10/2003 | Garneau | A41D 19/01523 2/161.1 |
| 2004/0003513 A1 | 1/2004 | Crane et al. | |
| 2004/0118017 A1 | 6/2004 | Dalton et al. | |
| 2004/0161989 A1 | 8/2004 | Dennis et al. | |
| 2004/0181971 A1 | 9/2004 | Turkbas et al. | |
| 2004/0194344 A1 | 10/2004 | Tadin | |
| 2005/0034330 A1 | 2/2005 | Baychar | |
| 2005/0039349 A1 | 2/2005 | Grisoni et al. | |
| 2005/0086838 A1 | 4/2005 | Khantzis | |
| 2005/0203454 A1 | 9/2005 | Wiener | |
| 2005/0210570 A1 | 9/2005 | Garneau | |
| 2005/0217142 A1 | 10/2005 | Ellis, III | |
| 2005/0234380 A1 * | 10/2005 | Fulford | A41D 13/0158 602/61 |
| 2006/0010608 A1 | 1/2006 | DeFranks et al. | |
| 2006/0026864 A1 | 2/2006 | Arbeiter | |
| 2006/0026867 A1 | 2/2006 | Polcek | |
| 2006/0026868 A1 | 2/2006 | Grisoni et al. | |
| 2006/0107553 A1 | 5/2006 | Clark et al. | |
| 2006/0228538 A1 | 10/2006 | Baychar | |
| 2006/0230488 A1 | 10/2006 | Rudolph | |
| 2006/0277801 A1 | 12/2006 | Schwarze et al. | |
| 2007/0022630 A1 | 2/2007 | Lundy, Jr. et al. | |
| 2007/0028485 A1 | 2/2007 | Crane et al. | |
| 2007/0028487 A1 | 2/2007 | Larson | |
| 2007/0066786 A1 | 3/2007 | Hanson, Jr. et al. | |
| 2007/0067895 A1 | 3/2007 | Sorensen | |
| 2007/0107261 A1 | 5/2007 | Cheskin | |
| 2007/0124960 A1 | 6/2007 | Friedman | |
| 2007/0174953 A1 | 8/2007 | Garneau | |
| 2008/0034614 A1 | 2/2008 | Fox et al. | |
| 2008/0047164 A1 | 2/2008 | Vindriis | |
| 2008/0072359 A1 | 3/2008 | Godshaw et al. | |
| 2008/0166524 A1 * | 7/2008 | Skaja | B32B 3/12 428/166 |
| 2008/0184467 A1 | 8/2008 | Brassill | |
| 2008/0256687 A1 | 10/2008 | Spencer | |
| 2008/0271340 A1 | 11/2008 | Grisoni et al. | |
| 2008/0299163 A1 | 12/2008 | Haskin et al. | |
| 2009/0025254 A1 | 1/2009 | Smith | |
| 2009/0025255 A1 | 1/2009 | Fusco | |
| 2009/0039688 A1 | 2/2009 | Wyner et al. | |
| 2009/0049712 A1 | 2/2009 | Steszyn et al. | |
| 2009/0056002 A1 | 3/2009 | Imai et al. | |
| 2009/0077707 A1 | 3/2009 | Scheffer | |
| 2009/0094856 A1 | 4/2009 | Guerra | |
| 2009/0119817 A1 | 5/2009 | Sonner | |

(56) References Cited

U.S. PATENT DOCUMENTS

| | | | |
|---|---|---|---|
| 2009/0126066 A1* | 5/2009 | Sasaki | A41D 13/065 2/24 |
| 2009/0162651 A1* | 6/2009 | Rios | A43B 13/04 428/354 |
| 2009/0186189 A1 | 7/2009 | White et al. | |
| 2009/0255625 A1* | 10/2009 | Fox | A43B 13/187 156/247 |
| 2009/0307829 A1 | 12/2009 | Onrot et al. | |
| 2009/0324927 A1 | 12/2009 | Palmer et al. | |
| 2010/0095433 A1 | 4/2010 | Turkbas | |
| 2010/0132099 A1 | 6/2010 | Green et al. | |
| 2010/0146816 A1 | 6/2010 | Cappaert et al. | |
| 2010/0159192 A1 | 6/2010 | Cotton | |
| 2010/0205831 A1 | 8/2010 | Cheskin et al. | |
| 2010/0226947 A1 | 9/2010 | Theberge et al. | |
| 2010/0269237 A1 | 10/2010 | Ben-Zicron | |
| 2010/0275350 A1 | 11/2010 | Wong | |
| 2010/0275351 A1 | 11/2010 | Wong | |
| 2010/0306908 A1* | 12/2010 | Fiegener | A41D 13/0153 2/463 |
| 2011/0061154 A1 | 3/2011 | Turner et al. | |
| 2011/0067160 A1 | 3/2011 | Grogro et al. | |
| 2011/0094124 A1 | 4/2011 | Zona | |
| 2011/0167529 A1 | 7/2011 | Anderson et al. | |
| 2011/0167548 A1 | 7/2011 | Jourde et al. | |
| 2011/0180744 A1 | 7/2011 | Haggquist | |
| 2011/0209275 A1 | 9/2011 | Berns et al. | |
| 2011/0233973 A1* | 9/2011 | Wyner | A41D 13/082 297/214 |
| 2011/0252549 A1 | 10/2011 | Jourde et al. | |
| 2011/0283432 A1 | 11/2011 | Best et al. | |
| 2011/0289663 A1 | 12/2011 | Kamradt | |
| 2011/0307999 A1 | 12/2011 | Jourde et al. | |
| 2012/0011656 A1 | 1/2012 | Daly | |
| 2012/0036619 A1 | 2/2012 | Ytterborn et al. | |
| 2012/0084896 A1* | 4/2012 | Wyner | A63B 71/08 2/16 |
| 2012/0090197 A1 | 4/2012 | Wyner et al. | |
| 2012/0090201 A1 | 4/2012 | Wyner et al. | |
| 2012/0096616 A1 | 4/2012 | Fisher et al. | |
| 2012/0098303 A1 | 4/2012 | Wyner et al. | |
| 2012/0102163 A1 | 5/2012 | Loth et al. | |
| 2012/0111343 A1 | 5/2012 | Turkbas et al. | |
| 2012/0174748 A1 | 7/2012 | Landi | |
| 2012/0180181 A1 | 7/2012 | Best et al. | |
| 2012/0198604 A1 | 8/2012 | Weber et al. | |
| 2012/0299341 A1 | 11/2012 | Wyner et al. | |
| 2013/0011623 A1 | 1/2013 | Jones et al. | |
| 2013/0061377 A1 | 3/2013 | Wyner et al. | |
| 2013/0185839 A1 | 7/2013 | Storelli et al. | |
| 2013/0244526 A1 | 9/2013 | Wyner et al. | |
| 2013/0269075 A1 | 10/2013 | Boye | |
| 2014/0196309 A1 | 7/2014 | Wyner et al. | |
| 2014/0331387 A1 | 11/2014 | Hennings | |
| 2015/0082523 A1 | 3/2015 | Wyner et al. | |
| 2015/0296899 A1 | 10/2015 | Wyner et al. | |

FOREIGN PATENT DOCUMENTS

| | | |
|---|---|---|
| CN | 2487255 Y | 4/2002 |
| CN | 200976876 | 11/2007 |
| CN | 201088697 Y | 7/2008 |
| CN | 202027317 U | 11/2011 |
| DE | 8524366 | 4/1989 |
| DE | 9110695 | 3/1992 |
| DE | 9412960 | 10/1994 |
| DE | 9218532 | 2/1995 |
| DE | 202010005301 | 9/2010 |
| DE | 202011109220 | 3/2012 |
| DE | 202013100788 | 5/2013 |
| DE | 20315786 | 3/2014 |
| DE | 202014006528 | 10/2014 |
| EP | 0846425 | 6/1998 |
| EP | 0872190 | 10/1998 |
| EP | 1369149 | 12/2003 |
| EP | 1550836 | 7/2005 |
| EP | 1847796 | 10/2007 |
| EP | 2014702 | 1/2010 |
| EP | 2436278 | 4/2012 |
| EP | 2436279 | 4/2012 |
| EP | 2439480 | 4/2012 |
| EP | 2229828 | 5/2012 |
| FR | 2815519 | 4/2002 |
| GB | 1556245 | 11/1979 |
| GB | 2246282 | 1/1992 |
| JP | S62-26193 | 7/1987 |
| JP | H6-504689 | 4/1992 |
| JP | H04-110505 | 9/1992 |
| JP | 3125428 | 9/2006 |
| RU | 2335260 | 10/2008 |
| TW | 391293 | 5/2000 |
| TW | M361240 | 7/2009 |
| WO | 9205717 | 4/1992 |
| WO | WO9302332 | 2/1993 |
| WO | WO9620615 | 7/1996 |
| WO | WO9733493 | 9/1997 |
| WO | WO9841118 | 9/1998 |
| WO | WO2004089132 | 10/2004 |
| WO | 2009041907 | 4/2009 |
| WO | WO2010044849 | 4/2010 |
| WO | WO2010106103 | 9/2010 |
| WO | WO2010110804 | 9/2010 |
| WO | WO2010140177 | 12/2010 |
| WO | WO2011082201 | 7/2011 |
| WO | WO2012021737 | 2/2012 |
| WO | WO2013040488 | 3/2013 |
| WO | WO2013116157 | 8/2013 |
| WO | WO2013142523 | 9/2013 |
| WO | WO2014153300 | 9/2014 |
| WO | WO2015167877 | 11/2015 |
| ZA | 3702042 A | 9/1997 |

OTHER PUBLICATIONS

International Search Report in International Application No. PCT/US2015/026961 dated Jul. 10, 2015.
International Search Report in International Application No. PCT/US2013/033016 dated Jun. 17, 2013.
International Search Report in International Application No. PCT/US2011/047472 dated Jan. 12, 2012.
International Search Report in International Application No. PCT/US2012/055617 dated Dec. 11, 2012.
Office Action in U.S. Appl. No. 14/375,091 dated Jan. 13, 2016.
Office Action in U.S. Appl. No. 14/375,091 dated Apr. 8, 2015.
Office Action in U.S. Appl. No. 13/618,610 dated Mar. 23, 2016.
Office Action in U.S. Appl. No. 13/618,610 dated Jul. 1, 2015.
Office Action in U.S. Appl. No. 13/618,610 dated Oct. 16, 2014.
Office Action in U.S. Appl. No. 13/618,610 dated Jan. 10, 2014.
Office Action in U.S. Appl. No. 14/158,776 dated Sep. 30, 2015.
Office Action in U.S. Appl. No. 13/237,929 dated Jul. 17, 2013.
Office Action in U.S. Appl. No. 13/237,931 dated Jul. 17, 2013.
Office Action in U.S. Appl. No. 13/847,422 dated Oct. 8, 2014.
Office Action in U.S. Appl. No. 13/847,422 dated Aug. 31, 2015.
Office Action in U.S. Appl. No. 13/847,422 dated Apr. 18, 2016.
Office Action in U.S. Appl. No. 13/208,229 dated Nov. 4, 2014.
Office Action in U.S. Appl. No. 13/208,229 dated Aug. 11, 2015.
Office Action in U.S. Appl. No. 13/208,229 dated Mar. 15, 2016.
737 McDavid Hex™ Thudd Short™, Retrieved from Internet at http://www.mcdavidusa.com/Product/737/MCDAVID_Short%E2%84%A2.aspx; retrieved on Sep. 18, 2014.
Nike Pro Combat Padded Shorts; Fighter Fashion.com; Retrieved from Internet at http://web.archive.org.web/20130828115103/http:fighterxfashion.com/nike-pro-combat-padded-shorts/; retrieved on Sep. 18, 2014.
MMA Gear Guide; Shock Doctor MMA Padded Compression Shorts; Retrieved from Internet at http://www.mmagearguide.com/shock-doctor-mma-padded-compression-shorts/; retrieved on Sep. 24, 2014.

(56) References Cited

OTHER PUBLICATIONS

GlobalSecurity.org; "Interceptor Body Armor", Retrieved from the Internet at http://www.globalsecutiry.org/military/systems/ground/interceptor.htm; Retrieved on Aug. 17, 2016.

Lane; Higher Performance Fibers for Personnel and Vehicle Armor Systems; Amptiac Quarterly, vol. 9, No. 2, 2005; retrieved online at http://amptiac.alionscience.com/quarterly.

Stern; "Body armor could be a technological hero of war in Iraq", The Christian Science Monitor; 2003; Retrieved from Internet at http://www.csmonitor.com/2003/0402/p04s01-usmi.html; Retrieved Aug. 17, 2016.

SFTT Blog: Stand for the Troops, "Interceptor OTV Body Armor Cost Lives, an Internal USMC Reports Shows", Retrieved from the Internet at http://sftt.org/blog/news/interceptor-otv-body-armor-cost-lives-an-internal-usmc-reports-shows ; Retrieved on Aug. 17, 2016.

Thermoplastic Polyurethanes—Bridge the Gap Between Rubber and Plastics; Alliance for the Polyurethanes Industry (API) Brochure; 2002.

Advanced Urethane Products, Inc. Field Services—Frequently Asked Questions (website section); 2006; retrieved from Internet at www.advancedurethane.com/faqs.htm; Retrieved on Aug. 8, 2011.

Personal Protection Equipment, Dickies Workwear Catalogue 2010, p. 164.

PORON® Urethanes—Soft Cushioning & Soft Supporting Materials, 2005-2007, 2013 Rogers Corporation, Publication #10-022.

"Impactactive Hip Protectors Help to Reduce the Risk of a Fall Related Hip Fracture", Impactwear International LLLP, Copyright 2015.

Majumder et al., "Effectiveness of a foam type hip pad in reduction of hip fracture: a 3D finite element study", The Institution of Egineering and Technology—vol. 41, suppl. 1, (2008), (http://www.jbiomech.com/article/S0021-9290(08)70452-4/abstract).

Kannus, et al., "Comparison of force attenuation properties of four different hip protectors under simulated falling conditions in the elderly: an in vitro biomechanical study"; Bone, vol. 25, Issue 2, pp. 229-235, Aug. 1999.

Louis Garneau Thermo Cool Insoles; Colorado Cyclist https://www.coloradocyclist.com/louis-garneau-thermo-cool-insoles, The Colorado Cyclist Inc., (2011).

Office Action in U.S. Appl. No. 14/692,738 dated Nov. 30, 2016.
Office Action in U.S. Appl. No. 13/618,610 dated Nov. 30, 2016.

* cited by examiner

FLEXIBLE CUSHIONING PADS, ITEMS INCORPORATING SUCH PADS, AND METHODS OF MAKING AND USING

CROSS-REFERENCE TO RELATED APPLICATIONS

This application is a Continuation application of U.S. application Ser. No. 13/208,229, filed on Aug. 11, 2011, which is incorporated herein by reference in its entirety. Priority is hereby claimed to commonly-owned and U.S. Provisional Patent Application No. 61/401,373 filed on Aug. 11, 2010 and U.S. Provisional Patent Application No. 61/382,022 filed on Sep. 12, 2010, both of which are incorporated herein by reference in their entirety, and U.S. Provisional Patent Application No. 61/404,906, filed on Oct. 12, 2010, and U.S. Provisional Patent Application No. 61/412,767, filed on Nov. 11, 2010.

TECHNICAL FIELD

The disclosure relates to conformable protection pads, articles that include such pads, methods of making and using the pads and articles and, in particular, to conformable protection pads for humans, for areas that require free range of motion.

BACKGROUND

Many activities, especially athletic activities, involve potential risk to the body from impact. Elbows, knees, shoulders, ankles, hips and other joints can be especially susceptible to impact damage and yet are challenging to protect without restricting the range of motion and movement of the individual. Impact protection can be heavy, non-breathable or restrictive, or alternatively does not target certain body parts accurately, or does so inconsistently.

Some impact protection systems consist of separate rigid pads that are heavy, and restrict motion. The rigid components can be lined with some form of soft cushioning to make them comfortable against the body, which is an attempt to cushion impacts to the body, but the extra layers add to the weight and discomfort of the pads. In addition, the padding systems can be hot to wear, and also restrict the evaporation of moisture and sweat.

Other protective pads are made from materials that are softer, so they bend, but offer little in the way of protection against a serious impact, especially an impact from a rock or other hard object. These materials include standard chemically foamed polyether or polyester foams.

Other padding can be made from stiffer foam materials, such as cross-linked polyethylene foams or EVA foams. Such foams offer a bit more protection, but restrict the user's range of motion. Overall, such materials offer insufficient protection, while restricting motion.

There also have been attempts to use stiffer foams as pads, but the foam had to be cut in strips in order to reduce the restriction of movement that a solid foam piece would cause. Unfortunately for the wearer, the strips offered less than optimal protection.

Foam can also be thermoformed into curved or complex shapes, and sewn between layers of material that holds the strips or pieces in place. Other materials that offer better impact absorption such as d30 have also been used in padding, but these materials are also stiff.

Attempts have been made to make the foregoing materials appear less stiff to the wearer by creating thinner regions in each piece which allows better flexing. But protective pads manufactured this way cannot offer full range of motion at the location of the padding, because the material breaks apart when flexed at the thinner areas. These materials also need to be buried beneath layers of fabric because they are not durable or aesthetically pleasing enough to be exposed. The use of covering materials adds unnecessary weight to the padding, and increases the cost of the pads.

A need exists for improved protective padding, particularly for areas requiring range of motion, and for joints.

SUMMARY

The present disclosure is directed, in one embodiment, to a cushioning pad that includes a first channel comprising a thickness and a width. The first channel comprises a continuous upper layer and a continuous lower layer, which is at least partially bonded to the continuous lower layer. The cushioning region is disposed adjacent to the first channel, and has a thickness greater than the thickness of the first channel. The cushioning region further includes a cushioning material disposed between and bonded to the continuous upper layer and the continuous lower layer. A groove maybe defined in the upper surface of the cushioning region, with a thickness less than the thickness of the cushioning region and greater than the thickness of the first channel.

In some embodiments, the cushioning pad includes a perimeter flange spaced apart from the cushioning region by the width of the channel, and the perimeter flange has a thickness greater than the thickness of the first channel and less than the thickness of the cushioning region. The perimeter flange includes the cushioning material disposed between and bonded to the continuous upper layer and the continuous lower layer.

In some embodiments, the continuous upper layer is at least partially bonded to the continuous lower layer in the perimeter channel by a plurality of portions of cushioning material disposed between and bonded to the continuous upper and lower layers.

In some embodiments, the perimeter channel includes a continuous layer of cushioning material disposed between and bonded to the continuous upper and lower layers.

The present disclosure is directed, in another embodiment, to a cushioning pad including a perimeter channel comprising a thickness and a width. The perimeter channel includes a continuous upper layer and a continuous lower layer. The continuous upper layer is at least partially bonded to the continuous lower layer. The cushioning pad includes a cushioning region adjacent to the perimeter channel, which has a thickness greater than the thickness of the perimeter channel. The cushioning region also includes a cushioning material disposed between and bonded to the continuous upper layer and the continuous lower layer. A perimeter flange is spaced apart from the cushioning region by the width of the perimeter channel, and has a thickness approximately equal to the combined thickness of the inner layer and the outer layer.

In any of the embodiments of the cushioning pad, the continuous upper and lower layers can comprise a polyester thermoplastic polyurethane.

In any of the embodiments of the cushioning pad, the continuous upper and lower layers can comprise a TPE film bonded to a layer spandex fabric, such that the TPE layers are disposed adjacent to the cushioning material.

In any of the embodiments of the cushioning pad, the cushioning material can comprise a cellular material comprising a plurality of cells having a minimum cell diameter, and the thickness of the cushioning material between the inner layer and the outer layer is less than the minimum cell diameter.

BRIEF DESCRIPTION OF THE DRAWINGS

The foregoing and other features and advantages will be apparent from the following more particular description of exemplary embodiments of the disclosure, as illustrated in the accompanying drawings, in which like reference characters refer to the same parts throughout the different views. The drawings are not necessarily to scale, emphasis instead being placed upon illustrating the principles of the disclosure.

DETAILED DESCRIPTION OF EXEMPLARY EMBODIMENTS

Figure 1A:
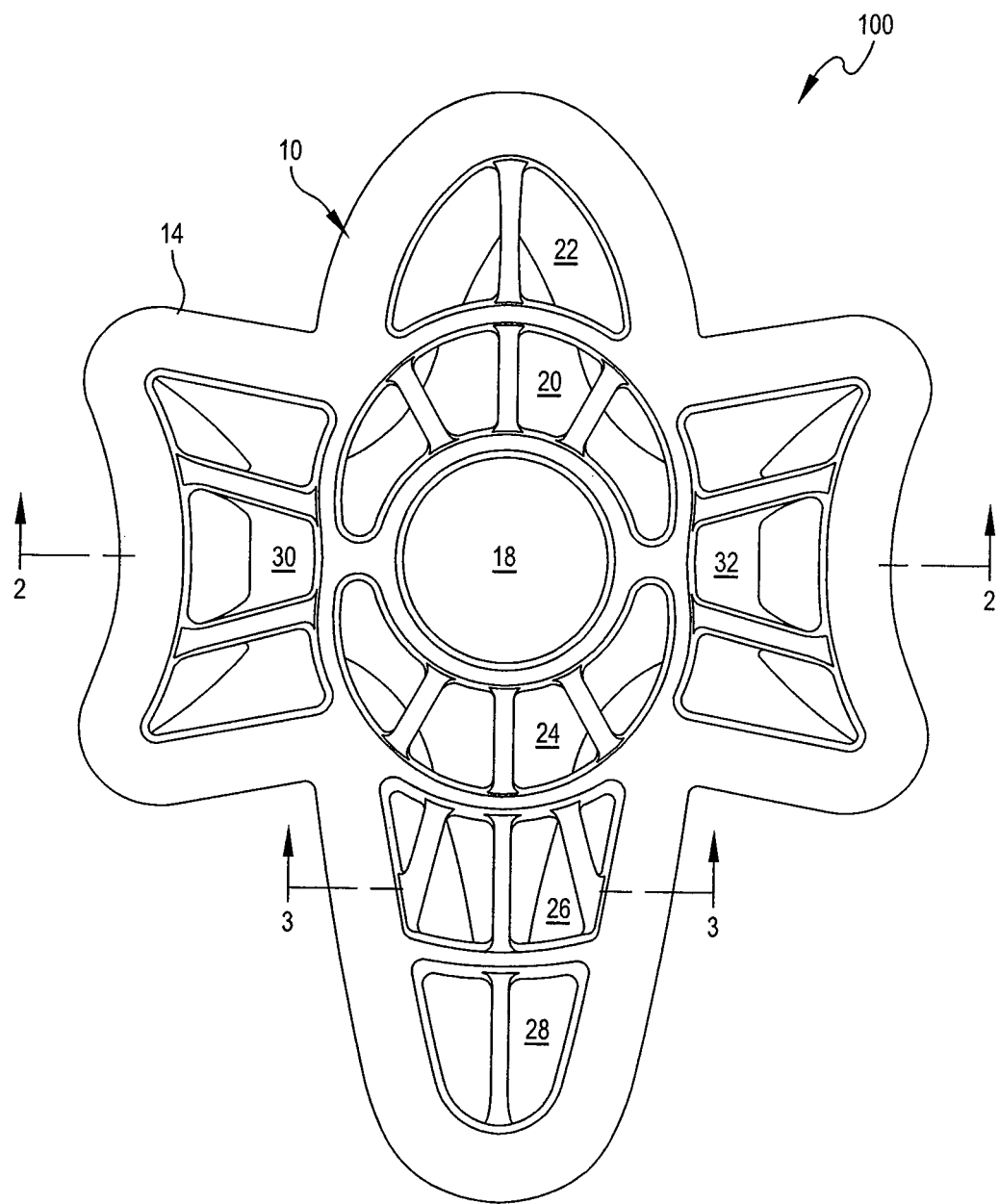
FIG. 1A is a top view of one exemplary cushioning pad according to the present disclosure, with various cushioning regions.

The present disclosure is directed to an improved, conforming cushioning pad, to items that include the pads, and to methods of making and using the pads.

The present pads include cushioning regions of various shapes, sizes, configurations and thicknesses. For ease of discussion, the terms "cushioning region" and "medallion" will used interchangeably throughout the description. Various materials can be used for the medallions, as will be described below. The medallions are spaced apart by channels of various depths and configurations, which define the perimeter of the medallions. The upper surface of the medallions may include grooves of various depths and configurations, which define, in part, the contours of the medallions. In some instances, a perimeter flange is provided, spaced apart from the perimeter of the pad.

The combination of the medallions, channels, grooves and flange, as well as the materials from which the pads are formed, together provide various functional characteristics to the pad. For example, the channels are deeper than the grooves, and are configured to provide unrestricted, free range of motion in critical areas, such as around joints. The grooves are shallower than the hinges, and provide flexibility, while retaining some cushioning and/or impact resistance. However, it should be understood that both the channels and the grooves function as "hinges," providing the pad with multilevel hinging.

The present cushioning pads can be incorporated into clothing, and can be designed to have specific functional characteristics. Such clothing is unique in its ability to provide mobile protection to areas of the body that flex, particularly joints. The padding can be incorporated into garments in a unique way, such that garment materials fit snugly, but stretch and conform to the body, or to a specific joint shape, resulting in an integrated padding system that protects the wearer from impact better than other products, because the pad is in constant and direct contact with the wearer during the full range of motion. Garments incorporating the present pads provide improved protection from injury when worn, because the base of the pad, or the material to which the base of the pad is attached, can be maintained in direct contact with the user's body during use, when incorporated into clothing that stretches and fits snugly, such as compression clothing. The flexibility of the pads allows the pads to conform to a user's body shape, so that the pad can be maintained in contact with the user's body. That is, without the degree of flexibility of the present pads, the pads would not be capable of conforming to the changing body contours of the user, while in motion. For ease of discussion, the term "flexible," as used herein, means the ability of the pad to move by bending, twisting, flexing and/or stretching, and the like.

By combining specific shapes, sizes, configurations, contours and orientations of the medallions, hinges, grooves and/or a perimeter flange, with specific pad and clothing materials, garments can be designed to maximize a user's free range of motion, while protecting specific, targeted areas of the body, particularly joints. Such garments are aesthetically pleasing, more durable, lower in cost, more comfortable, and provide significant range of motion and targeted, accurate, protection to the body.

Similarly, the present cushioning pads can be incorporated into other items, such as protective cases. For example, the padding can be incorporated into sleeves or cases that correspond to the shape and size of an electronic device, such as a laptop computer or a media device, such that they fit snugly, but also stretch and conform to the exterior of the case. Cases comprising the present pads can provide lightweight, flexible and impact-resistant protection.

The construction of the present pads and items including such pads provide items that are rugged, durable, and able to withstand the temperatures, detergents and mechanical action used in industrial and/or commercial laundering, unlike other padded clothing, which tends to degrade under such harsh conditions.

FIGS. 1A-1E, and FIGS. 2-3, when taken together, illustrate one exemplary cushioning pad 100 according to the present disclosure. Pad 100 has a shape, size and configuration adapted to the contours of an elbow joint, as noted above, but it should be understood that the pad can comprise any shape, size or configuration as is practical or desired for a particular design or application. As shown, pad 100 comprises a front surface 10, a back surface 12 and a perimeter 14. As shown in cross-section in FIGS. 2 and 3, pad 100 comprises a cushioning layer 15 disposed between optional outer and inner layers 16,17.

The optional outer layer 16 can comprise any material capable of providing sufficient elasticity to prevent tearing and/or stretching when a force is applied thereto; sufficient structural integrity to be formed into predetermined shapes; and that is capable of withstanding the environment in which it is intended to be used (e.g., repetitive deformations such as twisting, bending, flexing, stretching, and the like), without substantial degradation. The outer layer 16 also can be selected to facilitate the handling of layer 15, which can comprise adhesive characteristics, in some instances. Therefore, the outer layer 16 can be selected to provide a relatively non-tacky surface and smooth surface to the human touch, after molding.

Outer layer 16 can comprise any thickness, and the thickness can be varied depending upon the application. The desired thickness for a particular application can be determined using routine experimentation by those of ordinary skill in the art. Outer layer 16 can comprise a thickness ranging from about 0.2 milli-inches (hereinafter "mil") to about 60 mils, more particularly from about 0.5 mils to about 30 mils, and more particularly still from about 1.0 mil to about 15 mils.

In instances in which the hand-feel of the products is important, it has been found desirable to minimize the thickness of the outer layer. Therefore, in such products it can be desirable to use the thinnest outer layer possible without sacrificing durability. For example, for applications in which a relatively thin outer layer 16 is desirable, it can comprise a thickness ranging from about 0.2 mil to about 6 mil, more particularly from about 0.5 mil to about 3 mil, and more particularly still from about 0.6 mil to about 2 mil.

In some instances, it can be desirable to use a thicker outer layer 16, which can provide increased durability in comparison to thinner outer layers. For example, when the present materials are used in vibration dampening applications, it can be desirable for the thickness of the outer layer 16 to be about 50 to about 60 mil. Alternatively, thicker layers can be desirable when the cushioning layer is tacky, because the tacky material can be exposed if the outer layer 16 is punctured, making the products difficult to handle.

When the present products are formed using a thermoforming process, it can be desirable to use an outer layer having a thickness of up to about ⅛ inch, and even thicker in some instances when desired or necessary. It has been found that it is possible to maintain very soft pliability for outer layers having a thickness of as much as 6 mil or more by applying heat and/or a vacuum during the thermoforming process.

Outer layer 16 can be applied as a sheet of material during the molding process. In the form of a sheet, and especially when the outer layer is relatively thin, the material can be very flexible and may wrinkle and/or fold very easily during handling. Therefore, the outer layer 16 also can comprise a support layer (not illustrated), which assists in handling the material. Alternatively, the outer layer may also be applied as a coating of material during or after the molding process, using a variety of techniques known to those of skill in the art.

Suitable materials for the outer layer 16 include plastics, elastomeric materials such as rubber, thermoplastic elastomers ("TPE"), and/or the like, and combinations comprising at least one of the foregoing materials. Examples of plastics that can be used for the outer layer include, but are not limited to, ethylene-vinyl acetate ("EVA"), nylon, polyester, polyethylene, polyolefin, polyurethane, polyvinyl chloride ("PVC"), polystyrenes, polytetrafluoroethylene ("PTFE"), latex rubber, silicone, vinyl, and combinations thereof.

Other possible materials for the outer layer 16 include a variety of other synthetic and/or non-synthetic materials including, but not limited to, paper, fabric, metal, metallized plastic, plastic film, metal foil, and/or the like, as well as composites and/or combinations comprising at least one of the foregoing. Other durable materials can be used for the outer layer including knit, woven and nonwoven fabrics, leather, vinyl or any other suitable material. Use of a fabric layer as outer layer 16 can be advantageous because it can trap and disperse air bubbles that may otherwise form in or between the layers, resulting in a better appearance for the final molded products.

It can be desirable to use materials for the outer layer than are somewhat elastic; therefore, stretchy fabrics, such as spandex fabrics, can be desirable. The use of stretch fabric as the outer layer can be desirable because it can improve the flexing of the hinges and grooves, and the forming of the outer layer into a contoured shape. In some cases, heating or otherwise forming or pre-stretching materials with more limited stretch, can improve the molding process.

When outer layer 16 comprises a fabric layer, the fabric can be knit, woven, non-woven, synthetic, non-synthetic, and combinations comprising at least one of the foregoing, and the fabric layer can be laminated to, for example, a TPE film. When the pad application requires stretch, then use of an outer layer with elongation may be desirable, and when the outer layer is a laminate, it may be desirable for each layer in the laminate to elongate.

As noted above, it can be desirable to use materials for the outer layer than are somewhat elastic, such as the TPE materials mentioned above. Such TPE materials also can be desirable because they are available as films, in relatively low thicknesses. Any film thickness can be used provided it is compatible with the method of molding and suitable for the intended application, but film thicknesses of between about 1 mil and about 10 mils are desirable. Thicker films are more durable, but thinner films are less expensive, and may provide a softer feel. There are other reasons to choose thicker films, such as when thermoforming deeper shapes, as described later herein. While films thinner than 1 mil or thicker than 10 mils can be used in such applications, it may be desirable to use thicker films. The use of a film rather than a fabric as the outside layer can make the product easy to clean and protect the cushioning material from damage and dirt. The films can comprise an elongation of about 100 percent (%) to about 1500%, more particularly about 200% to about 1000%, and more particularly still about 300% to about 700%".

Some possible TPE materials include styrenic block copolymers, polyolefin blends, elastomeric alloys, thermoplastic polyurethanes, thermoplastic copolyester, thermoplastic polyamides, and combinations thereof. Examples of commercially available elastomeric alloys include melt-processable rubbers and thermoplastic vulcanizates. Examples of suitable TPEs include thermoplastic polyurethanes ("TPU"). TPU film can be desirable due to its combination of durability, elasticity, softness and flexibility. One suitable film is a polyester polyurethane film available from Deerfield Urethane, a Bayer Material Science Company, under the product name Dureflex PS5400. It can be desirable to use a polyester TPU film, rather than a polyether TPU film, because the polyester TPU film, in addition to having improved abrasion resistance in comparison to polyether TPU film, also performs unexpectedly well under high humidity conditions, such as in athletic clothing and commercial laundering.

Additionally, pads and garments can be manufactured with both fabric and film on different parts of the pad, allowing for full range of motion and further protection from the use of both materials. It may be desirable that the outer layer be a composite of a fabric and film so that the film aids in protecting the hinge during flexing and can also serve as a protective barrier for the cushioning material.

Inner layer 17 can comprise the same materials as the outer layer 16. When inner layer 17 comprises a fabric layer, the fabric can be knit, woven, non-woven, synthetic, non-synthetic, and combinations comprising at least one of the foregoing, and the fabric layer can be laminated to, for example, a TPE film. When the pad application requires stretch, then use of an inner layer with elongation may be desirable, and when the inner layer is a laminate, it may be desirable for each layer in the laminate to elongate. Use of a fabric layer as inner layer 17 can be advantageous because it can trap and disperse air bubbles that may otherwise form in or between the layers, resulting in a better appearance for the final molded products.

The use of active agents in one or more of the inner layer, outer layer and/or the cushioning layer can be desirable. For example, the addition of a silver or copper based active agent can provide the material with antimicrobial or antifungal properties. The use of actives in the inner or outer layer or the foam itself can be desirable, such as the addition of silver or copper based actives to act as an antimicrobial or antifungal agent.

One or both of inner and outer layers 16,17 also can comprise color, graphics and/or indicia, including text. The color, graphics and/or indicia disposed on such layers can be transmitted through other layers when they are formed from colorless and/or transparent materials, which can be desirable for aesthetic and costs reasons. In addition, if desired, one or both of inner and outer layers 16,17 also can be fluid-permeable. "Fluid-permeable," as used herein, means that the material from which the layer is formed is open to passage or entrance of a fluid material.

With continued reference to FIGS. 1A-1E, and FIGS. 2-3, pad 100 comprises least one cushioning region disposed in the upper surface 10. In the present exemplary embodiment, pad 100 comprises a central, circular medallion 18. A first, upper, crescent-shaped medallion 20 is disposed adjacent to, above and spaced apart from medallion 18, and an upper, semi-circular shaped medallion 22 is disposed adjacent to, above and spaced apart from the upper crescent region 20. A second, lower, crescent-shaped medallion 24 is disposed adjacent to, below and spaced apart from the central region 18, opposite from and spaced apart from the upper crescent region 20. An approximately trapezoidal medallion 26 is disposed adjacent to, below and spaced apart from the lower crescent-shaped medallion 24; and, a second, lower, approximately semi-circular medallion 28 is disposed adjacent to, below and spaced apart from the trapezoidal region 26. Opposing approximately trapedoizal-shaped medallions 30,32 are disposed on the left and right sides of the central region 20, adjacent to and spaced apart from the upper and lower crescent regions 20,24.

Figure 1B:
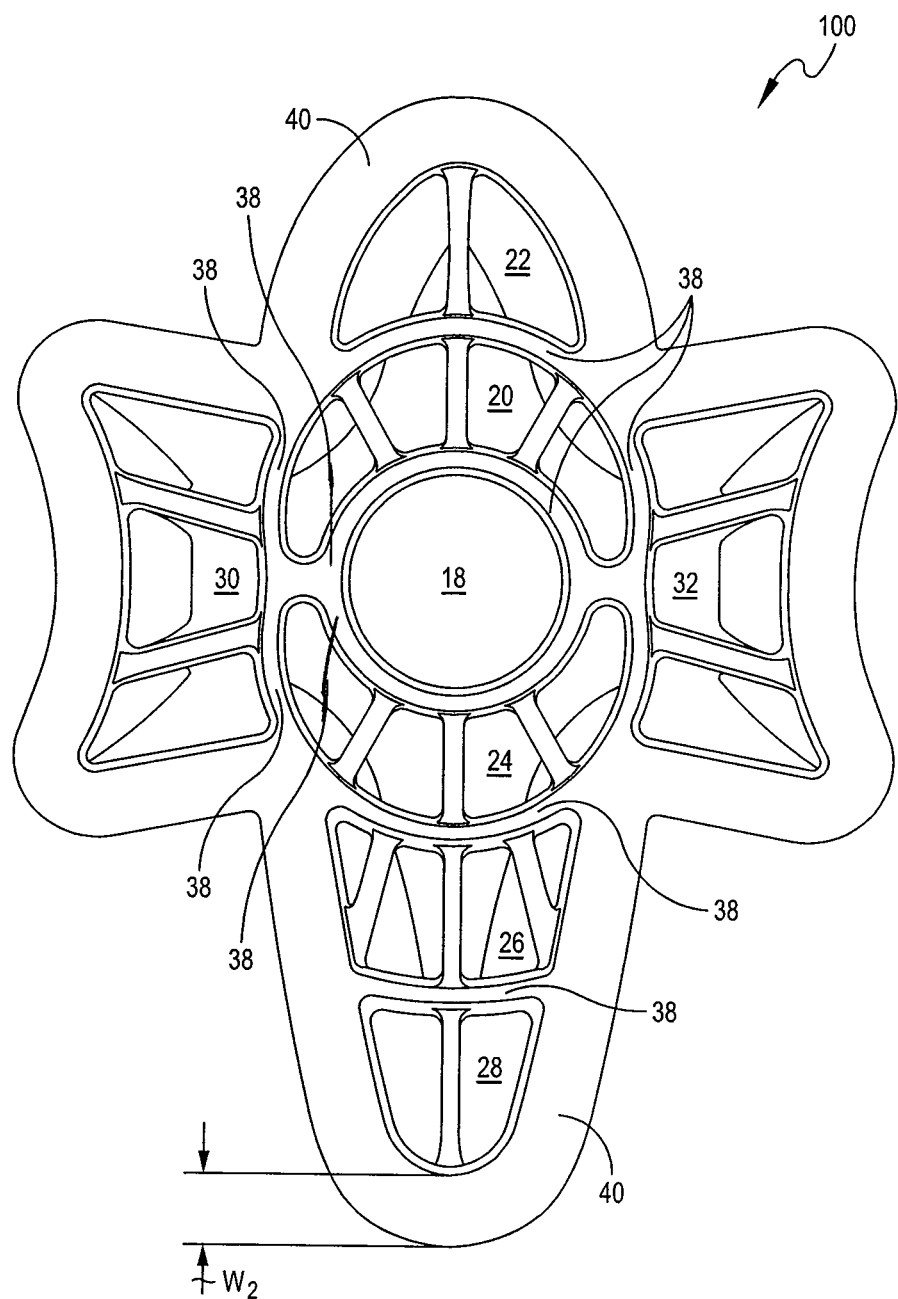
FIG. 1B is a top views of the cushioning pad shown in FIG. 1A.
Figure 1C:
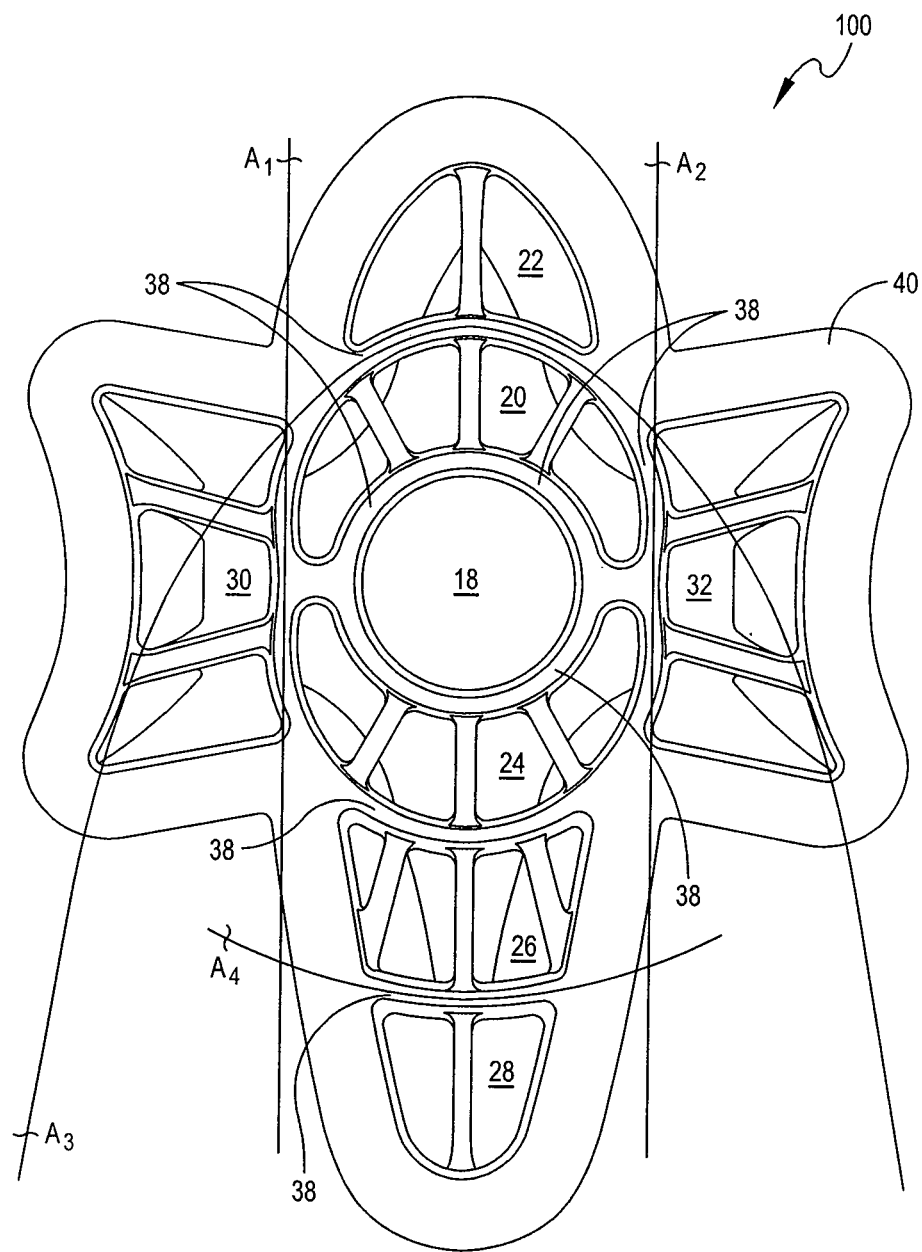
FIG. 1C is a top views of the cushioning pad shown in FIG. 1A.
Figure 1D:
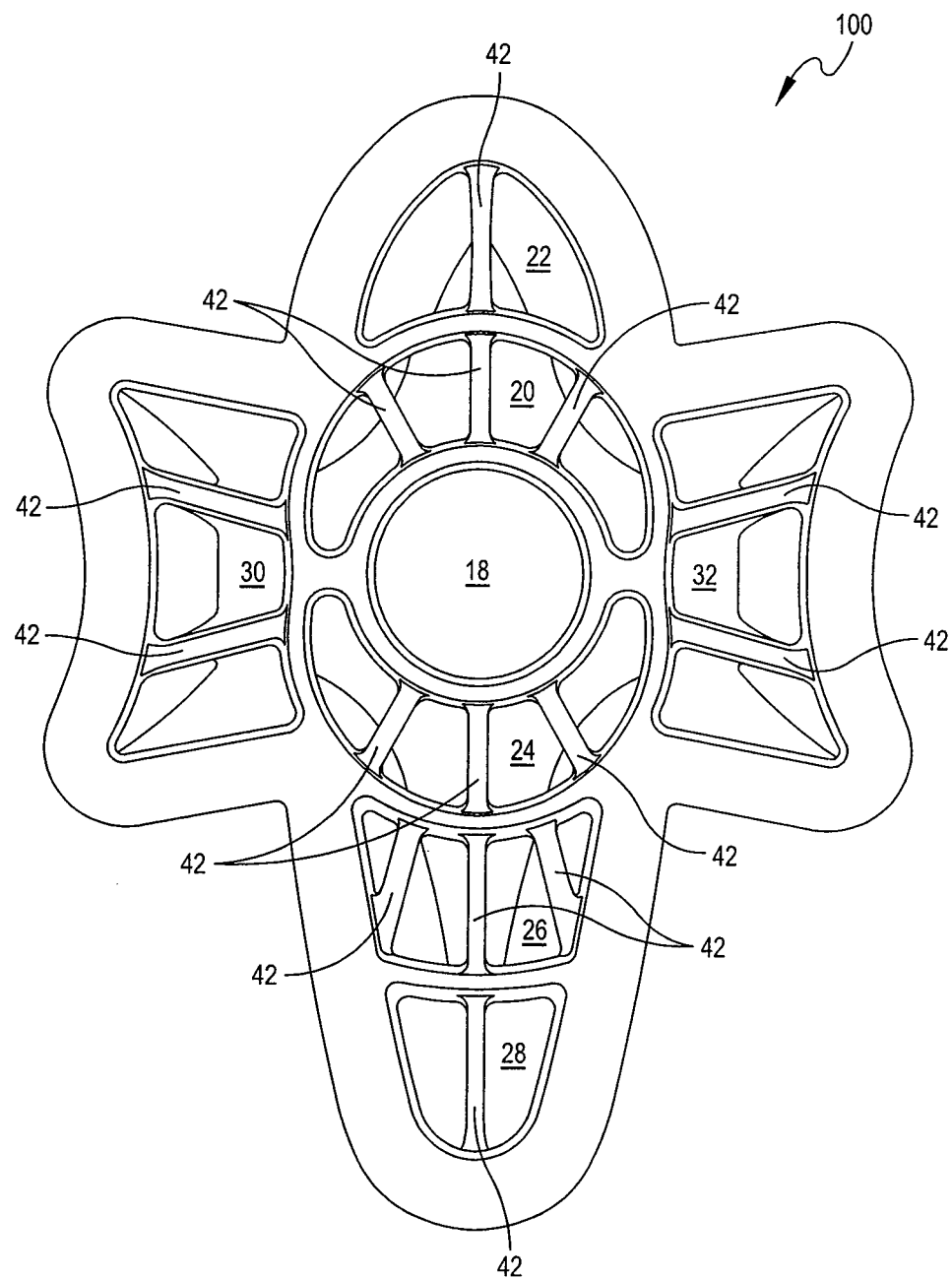
FIG. 1D is a top views of the cushioning pad shown in FIG. 1A.
Figure 2:
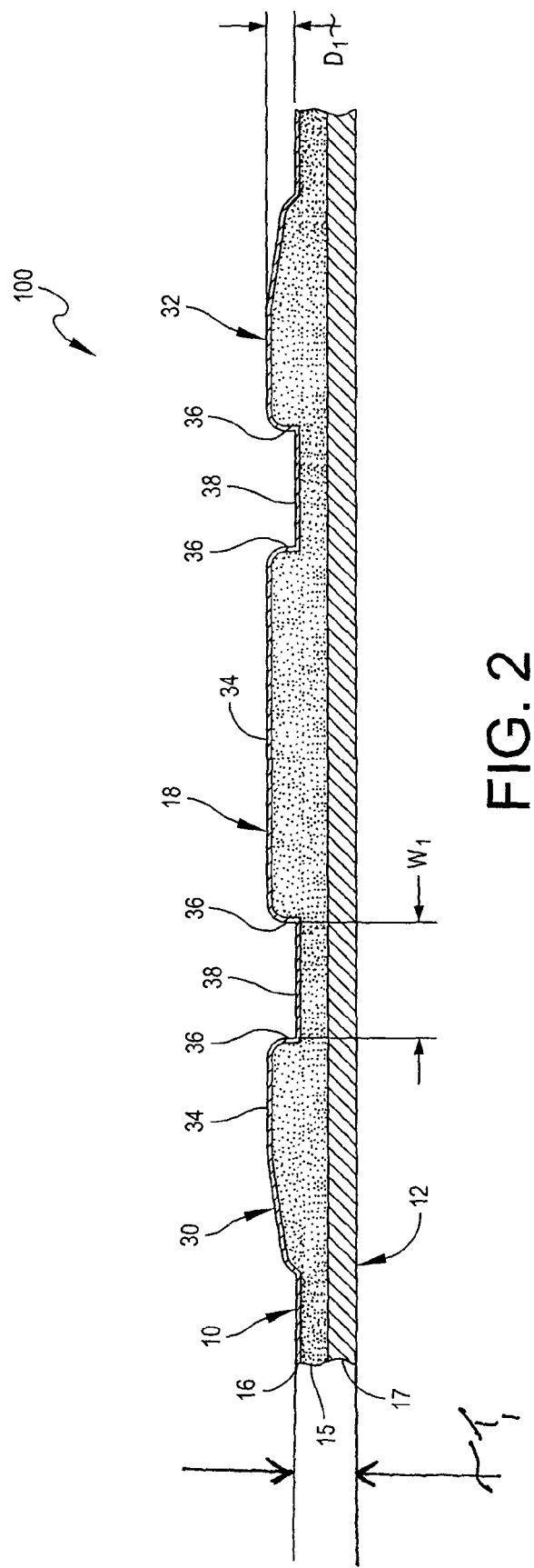
FIG. 2 is a schematic side view of the cushioning pad of FIG. 1A, through line 2-2.
Figure 3:
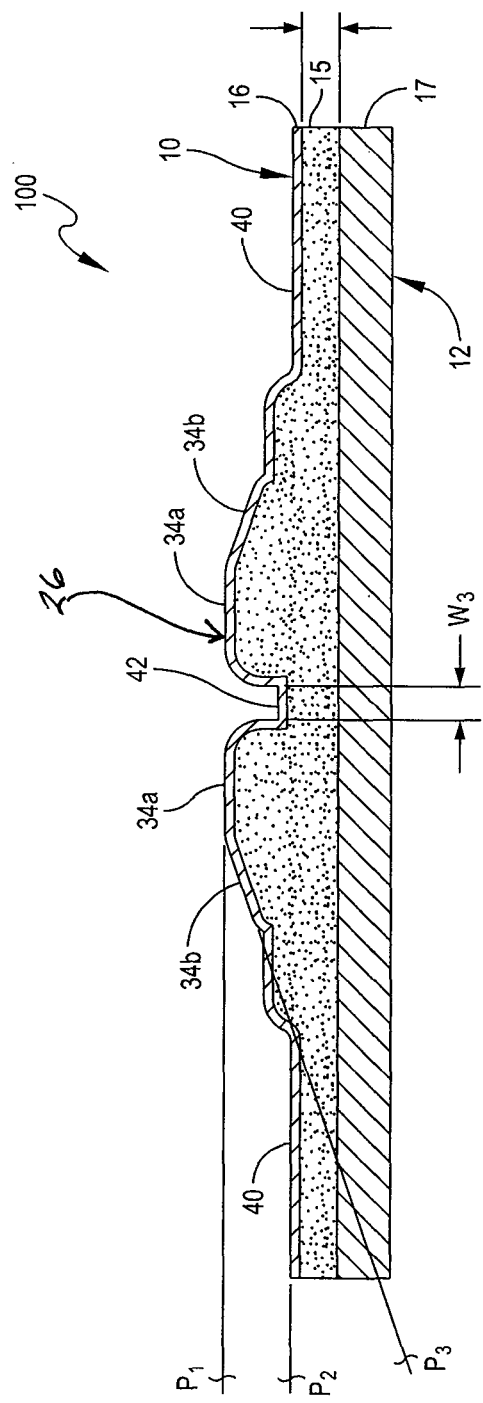
FIG. 3 is a schematic side view of the cushioning pad of FIG. 1A, through line 3-3.

As shown best in FIGS. 1C, 2 and 3, each of the foregoing medallions 18, 30, 32 comprises an upper surface 34 and a sidewall 36 extending downwardly to the upper surface 10 of the pad 100. The sidewalls 36 may be perpendicular to the upper surface 34, or have an angled profile relative to the upper surface 34, coming to a point at the bottom of the hinge or groove. Thus, the hinges and/or grooves may have a saw-tooth shape or have angled walls in some embodiments, which minimizes the exposure of the hinges.

The size, shape, thickness and material composition of the medallions may be varied, depending on a number of factors including, but not limited to, desired amount of flexibility for the pad. In addition, the configuration of the medallions may be varied, and more than one type of medallion shape may be used in the pads.

Cushioning layer 15 can comprise one or more layers of any material or combination of materials having sufficient structural integrity to be formed into predetermined shapes, such as by molding, and that are capable of withstanding the environment in which they are intended to be used, without substantial degradation.

The material type and composition can be selected to provide articles and/or regions of articles with predetermined material characteristics, which can be used to customize the pads for specific applications such as cushioning, impact resistance, wear resistance, and the like. Examples of suitable materials include polymeric materials, composite materials, and the like. Examples of suitable polymeric materials include, but are not limited to, thermosetting polymeric materials, elastomeric polymeric materials, thermoplastic materials, including thermoplastic elastomeric materials, and combinations comprising at least one of the foregoing. Some possible polymeric materials include, but are not limited to, polyurethane, silicone, and/or the like, and combinations comprising at least one of the foregoing materials.

In some instances, it may be desirable for the pad to have cushioning characteristics to provide a soft, pliable and comfortable feel such as when used in contact with a body. In such instances, it has been found that some polymeric gels may be suitable. One example of a suitable polymeric gel is a polyurethane gel comprising a durometer ranging from about 0.01 Shore 00 to less than or equal to about 70 Shore A, more particularly less than 70 Shore 00, more particularly still less than 60 Shore 00. The material can comprise a durometer ranging from about 30 Shore 000 to about 88 Shore D. The durometer of the polymer can be determined by those of ordinary skill in the art using tools such as durometers or penetrometers. Formation of the gel can take place by a variety of methods known to those of skill in the art. For example, formation of a polyurethane gel can comprise reacting suitable pre-polymeric precursor materials e.g., reacting a polyol and an isocyanate in the presence of a catalyst.

In some instances, it may be desirable for the pad to be lightweight, and in such instances, the cushioning material 15 may comprise a foam material, such as a low density foam material. Examples of suitable low density foams include polyester and polyether polyurethane foams.

In some instances, it may be desirable for the pad to be capable of providing impact resistance. In such instances, various types of impact absorbing materials have been found suitable for the cushioning material, particularly energy absorbing foams. For such applications, it can be desirable for such foams to have a density ranging from about 5 to about 35 pounds per cubic foot (pcf), more particularly from about 10 to about 30 pcf, and more particularly still from about 15 to about 25 pcf. Suitable rate dependent foams are available from Rogers Corporation under the brand names PORON® and PORON XRD®, which are open cell, microcellular polyurethane foams.

With continued reference to FIGS. 1A-1E, and FIGS. 2-3, one or more channels are defined in the upper surface 10 to maintain the medallions 18, 30, 32 in spaced apart relation. As shown in FIG. 2, channels 38 have a width "$W_1$" defined by the spacing between the perimeter of adjacent medallions, a depth "$D_1$" defined by the spacing between the upper surface 34 of the medallions and the upper surface 10 of the pad 100, and a thickness "$T_1$" defined by the combined thicknesses of the inner and outer layers 16,17 and the cushioning material 15 disposed between the layers. For each of discussion, the "channels" will be referred to hereinafter as hinges throughout the description, without intending to limit the fact that the grooves also function as hinging elements.

The width $W_1$ of the hinges can be varied as desired or needed, and can range from as narrow as about 1 mil to about 1000 mils, or more. In some instances, it can be desirable for the width "$W_1$" of the hinges to be as narrow as possible, in order to maximize the protective features of the medallions, while maintaining the hinging ability of the pads. Such applications would include applications in which maximum protection is desired, or in which the hinge is intended to wrap around a corner. Where impact protection is desired, the width of the hinges can be designed to be narrower than the width of the object which would impact the pad. In such instances, the width $W_1$ can range from about 1 mil to about 10 mils, more particularly from about 3 mils to about 7 mils, and more particularly still about 5 mils.

In other instances, in which the protective features are less important, it can be desirable for the width "$W_1$" of the hinges to be much wider, in order to maximize the aesthetic feature of the hinges, which can be made to contrast in color with the medallions. In such instances, the width $W_1$ can be in the millimeter or centimeter range, or even greater, if desired.

The hinges 38 may be linear channels that are disposed along parallel and/or intersecting axes, as shown in FIG. 1C. As shown in the present embodiment, hinges 38 may be approximately aligned along parallel axes "$A_1$" and "$A_2$." Hinges 38 may also be curved, as shown by curves "$A_3$" and "$A_4$." The depth of the hinges between the medallions may be the same or different, and the depth may vary along the hinge. Both curved and linear hinges may be used in combination in the pads, as in the present embodiment, and may include a combination of curved and linear hinged areas.

As shown best in FIG. 1B, an optional perimeter flange 40 (hereinafter "flange") may be defined in the upper surface 10 to maintain the medallions in spaced apart related from the perimeter of the pad. In the present embodiment, the optional perimeter flange 40 has a width "$W_2$" defined by the spacing between the perimeter of the outermost medallions and the perimeter 14 of the pad 100. The width $W_2$ of the perimeter flange 40 may vary, as desired. As will be described in greater detail below, the perimeter flange 40 is thinner than the medallions, allowing the pad to be attached to items such as clothing along the flange area using a variety of techniques, such as by sewing, gluing, bonding, and the like. When integrated with, for example, a compression sleeve, the pad can be sewn, glued or otherwise attached to the outside of the sleeve fabric, or it can be sewn or attached to the interior surface of the sleeve, and exposed through a corresponding opening in the sleeve.

Optionally, the upper surfaces 34 of the medallions may be contoured using a variety of geometries, including planar surfaces, curved surfaces, and combinations of planar and curved surfaces. As shown in FIG. 3, in the present embodiment, the upper surface 34 of medallion 26 comprises a planar portion 34a lying in a plane "$P_1$" that is approximately parallel to a plane "$P_2$," $P_2$ being co-planar with the upper surface 10 of pad 100. The upper surface 34 of medallion 26 also comprises another portion 34b lying in a plane $P_3$ that intersects planes $P_1$ and $P_2$. The thickness of portion 34b generally decreases radially toward the perimeter of the medallion 26. Alternatively, the upper surface 34 of a medallion may comprise a surface that is defined by a thickness that generally decreases radially toward the perimeter of the medallion, or toward the perimeter of the pad.

As shown best in FIGS. 1C and 3, optionally, one or more grooves 42 may be formed in the upper surface 34 of the medallions. Like the hinges 38, the grooves 42 increase the flexibility of the pad, and as the thickness of the cushioning layer 15 in the grooves 42 is decreased, the flexibility of the grooves 42, and pad 100, increases. The width, depth, orientation and position of the grooves 42 in the upper surfaces 34 of the medallions may be varied, depending on a number of factors including, but not limited to, the desired direction and amount of flexibility, and the like.

Figure 1E:
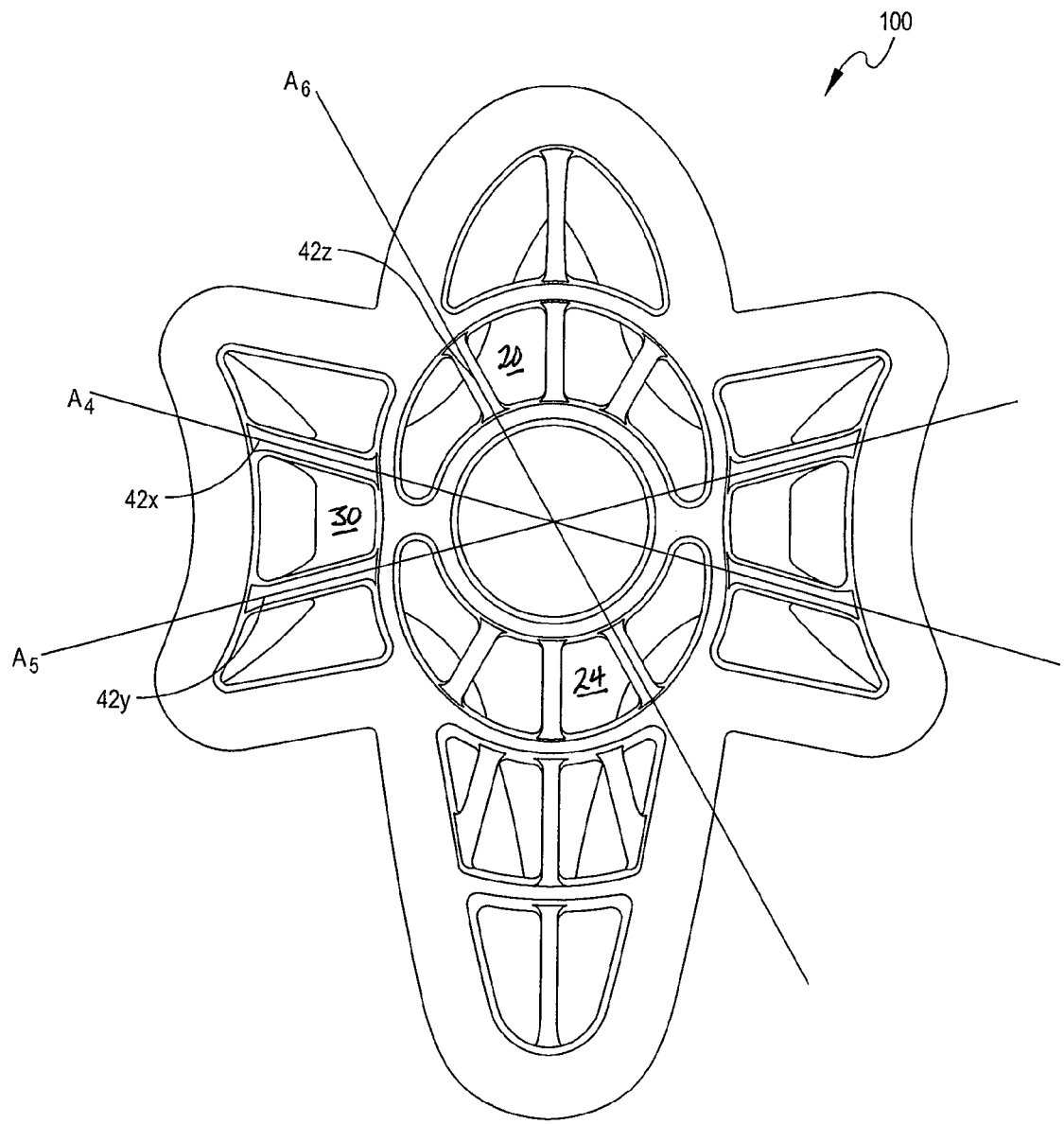
FIG. 1E is a top views of the cushioning pad shown in FIG. 1A.

Like hinges 38, the grooves 42 may be curved grooves, or linear grooves that are disposed along parallel and/or intersecting axes. Both curved and linear grooves may be used in combination, and the grooves may include both curved and linear regions. As shown in FIG. 1E, in the present embodiment, the left trapezoidal medallion 30 comprises a first linear groove 42x having an axis "$A_4$" that intersects the center medallion 18 and a second a linear groove 42y having an axis "$A_5$" that intersects with axis $A_4$. As shown, both axes intersect approximately at the center of center medallion 18 and extend radially from the center medallion 18 toward the perimeter 14 of the pad 100, but it should be understood that it is not necessary for the axes of the grooves to intersect at the center of the pad. Similarly, adjacent medallion 20 comprises a third linear grove 42z having an axis "$A_6$" that intersects with axes $A_4$ and $A_5$. The thickness of the grooves in a pad or in a medallion may be the same or different, and the thickness may vary along the axis or length of the groove, and from groove to groove.

Figure 4:
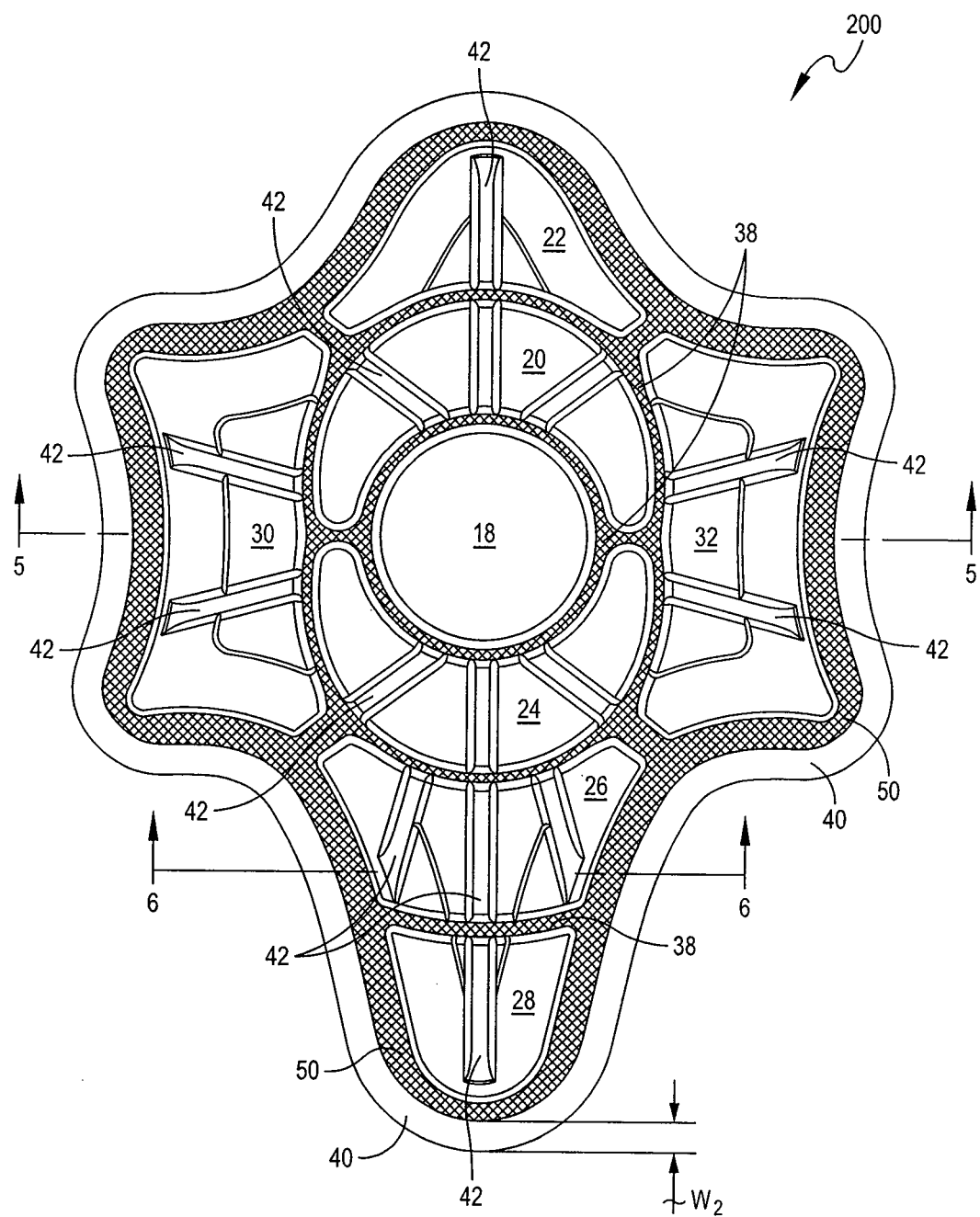
FIG. 4 is a top view of another exemplary cushioning pad according to the present disclosure.
Figure 5:
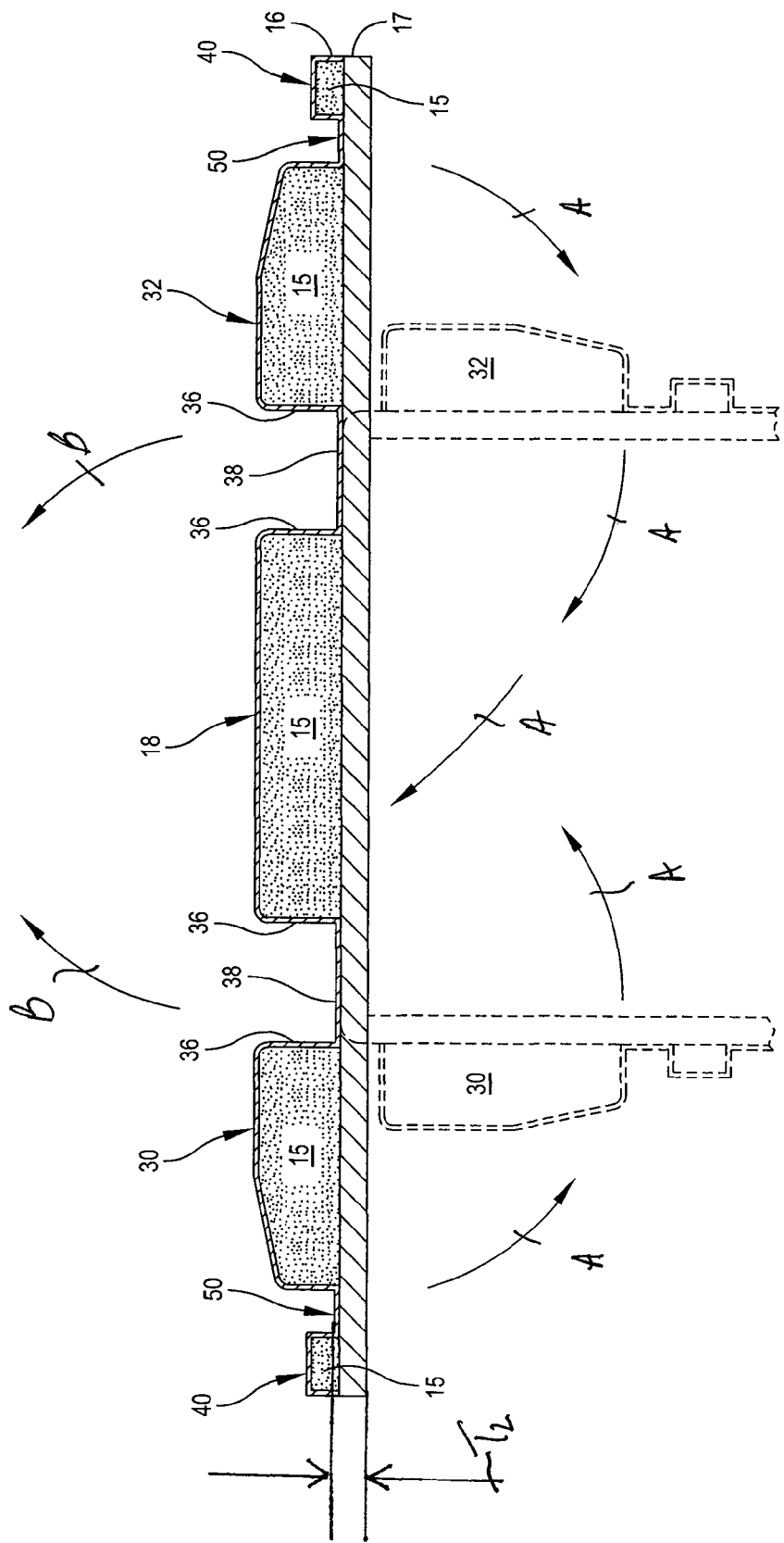
FIG. 5 is a schematic side view of the cushioning pad of FIG. 4, through line 5-5.
Figure 6:
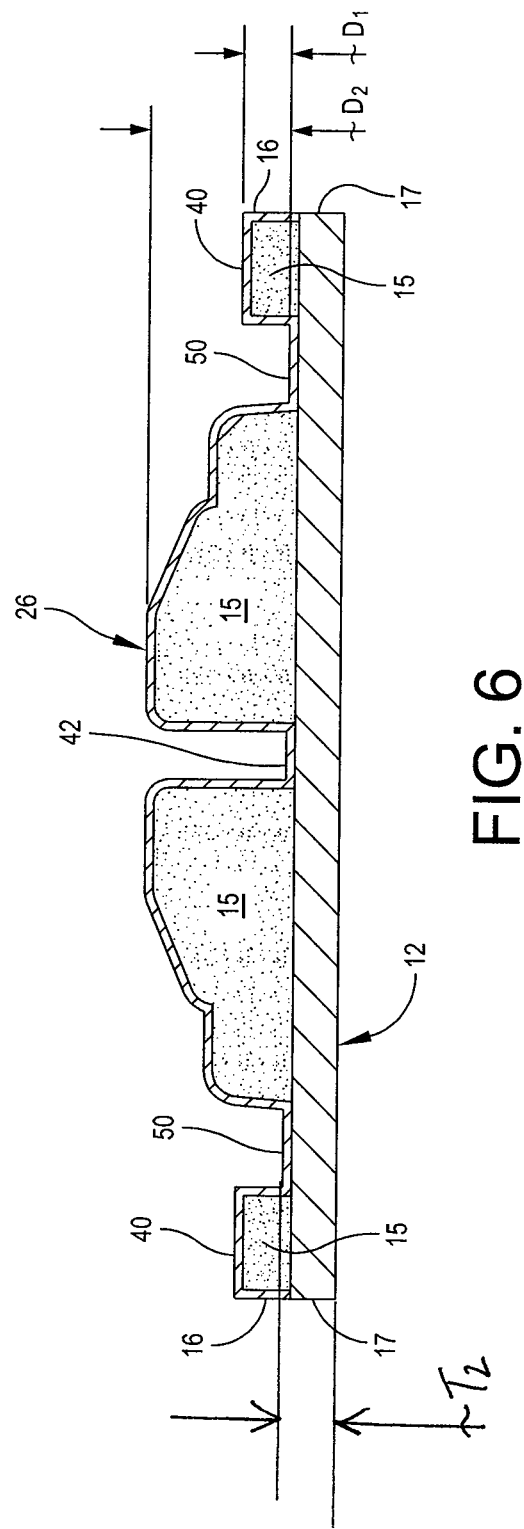
FIG. 6 is a schematic side view of the cushioning pad of FIG. 4, through line 6-6.

FIGS. 4-6, when taken together, illustrate another embodiment of an exemplary cushioning pad 200 according to the present disclosure. Pad 200 has a similar structure to pad 100, comprising a front surface 10, a back surface 12 and an outer edge/perimeter 14, with a cushioning layer 15 disposed between optional outer and inner layers 16,17. Pad 200 comprises the same medallions as in pad 100. Optionally, one or more grooves 42 may be formed in the upper surface 34 of the medallions.

Also as in the previous embodiment, hinges 38 are defined in pad 200, to maintain the medallions in spaced apart relation, and to provide flexibility to the pad. The hinges 38 have a width "$W_1$" defined by the spacing between the perimeter of adjacent medallions, and a depth "$D_1$" defined by the spacing between the upper surface 34 of the medallions the upper surface 10 of the pad 200, and a thickness "$T_2$" defined by the combined thicknesses of the inner and outer layers 16,17 and the cushioning material 15, if any, disposed between the layers.

Pad 200 also comprises an additional perimeter hinge 50, which corresponds to the shape of the perimeter of the pad. Like hinge 38, perimeter hinge 50 has a width "$W_1$" defined by the spacing between the perimeter of adjacent medallions and perimeter flange 40, a depth "$D_1$" defined by the spacing between the upper surface 34 of the medallions and the upper surface 10 of the pad 200, and a thickness "$T_2$"

defined by the combined thicknesses of the inner and outer layers 16,17 and the cushioning material 15, if any, disposed between the layers.

In the present embodiment, the thickness of the cushioning layer 15 disposed between the upper and lower layers 16,17 in hinges 38,50 is minimized during the manufacturing process, such that its thickness approaches zero in the hinges 38,50. As a result, the cushioning material in the hinges 38,50 may not be visible to the naked eye, or only detectable using very sensitive thickness gauges.

The residual cushioning material remaining in between layers 16,17 assists in bonding layers 16,17 together in the hinges 38,50. Depending on the materials used, the bonding between layers 16,17 may be at least partially a chemical, thermal and/or mechanical bond. For example, if the material used as the cushioning layer is a resin, the residual resin in the hinges 38,50 can function as an adhesive to bond layers 16,17 together. Use of the resin as a bonding agent is advantageous, because it eliminates the need for a separate adhesive in the very thin hinge areas, and it keeps the bond consistent and equally flexible throughout pad, thereby enhancing the durability of the pad.

Alternatively, if a fabric is used as one of layers 16,17, the bond between the layers in the hinges may be at least partially mechanical, as a result of the resin being squeezed into opening or pores in the fabric, such that portions of layers 16,17 bond during manufacturing, resulting in "islands" of bonded layers 15,16,17 disposed between islands of bonded layers 16,17.

By minimizing or eliminating the cushioning layer 15 in hinges 38,50, the flexibility of the hinges is maximized, such that the entire pad 200 is capable of bending, flexing, folding and twisting in a variety of direction. For example, pad 200 bending or flexing along the hinges 38,50 by as much as 180 degrees in the direction of arrow "A," as shown in FIG. 5. In the opposite direction "B," the flexibility is limited only by the thickness and spacing of the medallions.

In the present embodiment, the presence of the continuous bond between the inner and outer layers 16,17 in the hinges 38,50 is advantageous because it "locks" the medallions in place, minimizing or preventing the egress of cushioning material from the pad or, alternatively, minimizing or preventing the ingress of materials, such as fluids, into the pads. Therefore, the hinges 38,50 stabilize the pads, particularly the cushioning material, such that fluids and other materials are not able to penetrate the pad, which might otherwise lead to delamination.

Figure 7:
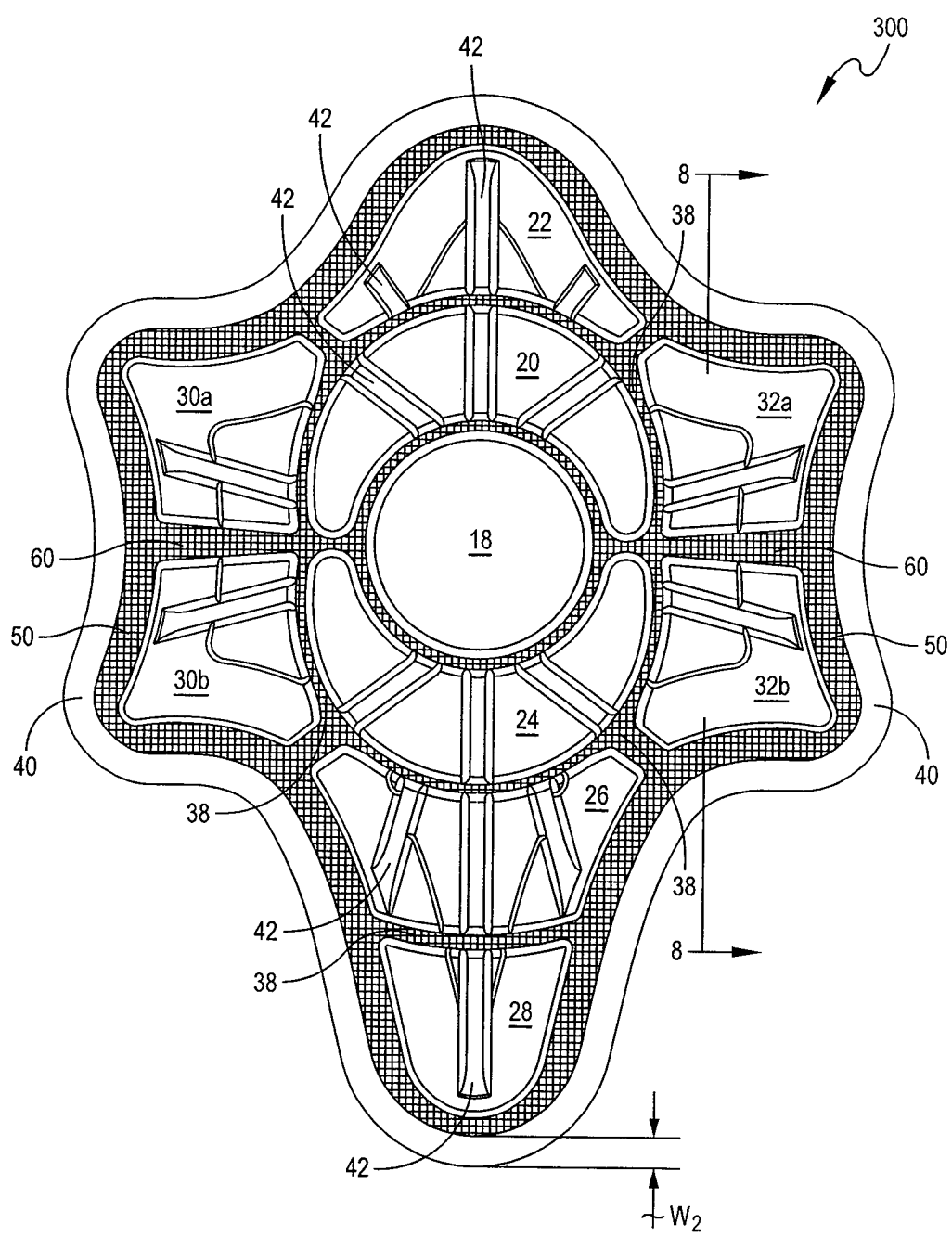
FIG. 7 is a top view of another exemplary cushioning pad according to the present disclosure.
Figure 8:
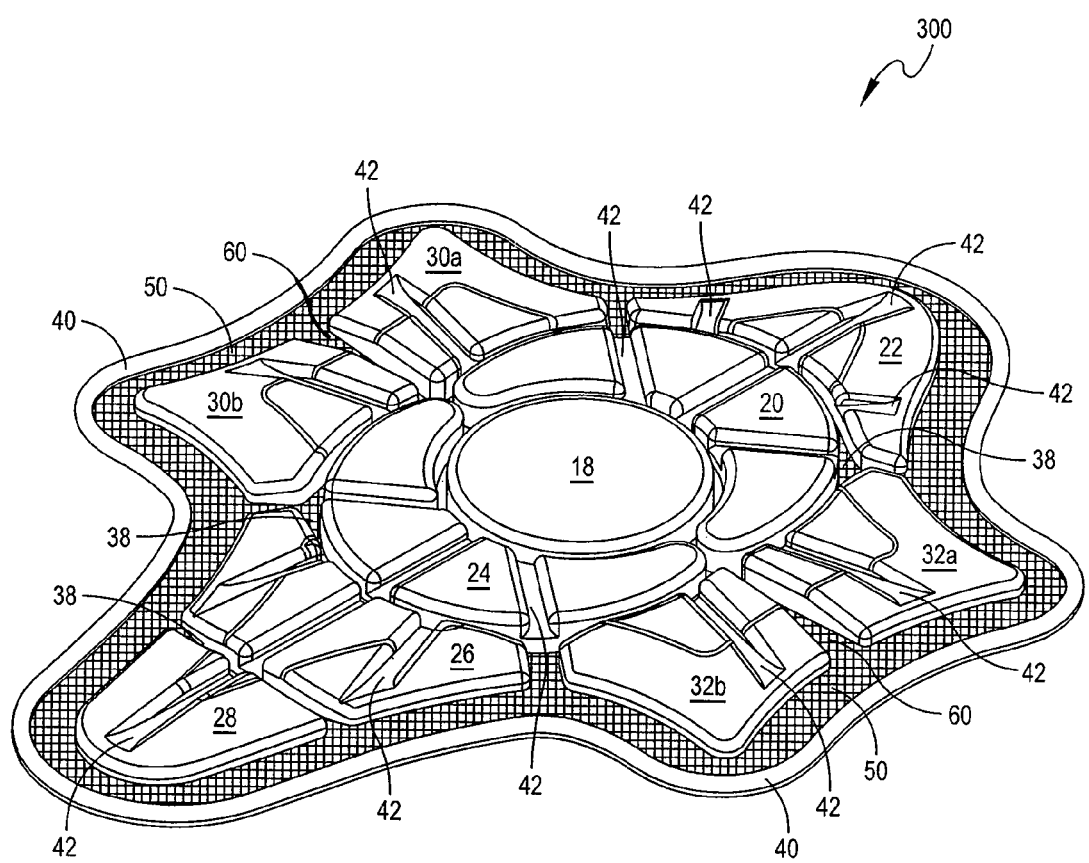
FIG. 8 is a perspective view of the cushioning pad of FIG. 7.
Figure 9:
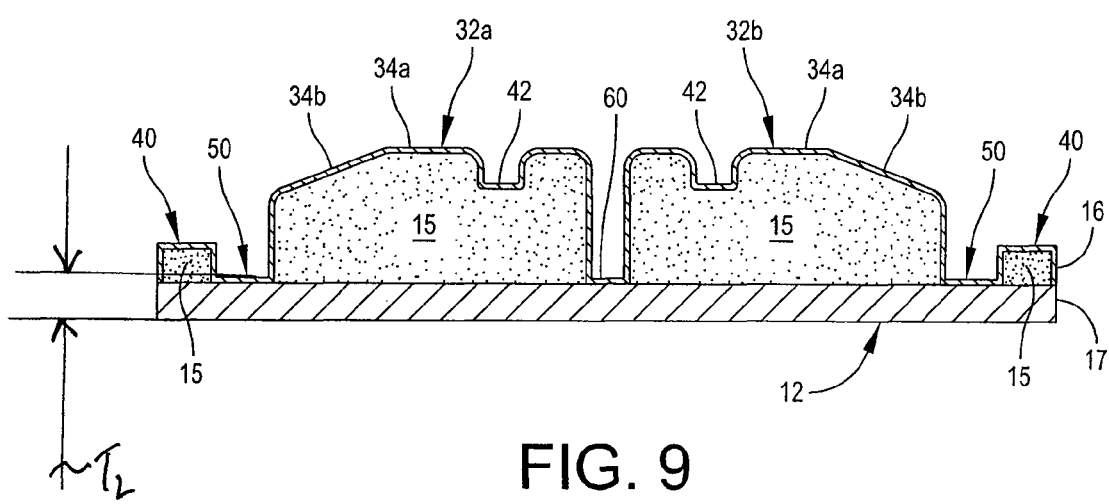
FIG. 9 is a schematic side view of the cushioning pad of FIG. 7, through line 8-8.

Another exemplary cushioning pad 300 according to the present disclosure is illustrated in FIGS. 7-9, when taken together. Pad 300 is similar in construction to pad 200, and additionally comprises a hinge 60 disposed between medallions 32a,b. Like hinges 38,50, the addition of hinge 60 increases the capability of pad 300 to bend, flex, fold and twist in a variety of directions.

Figure 10:
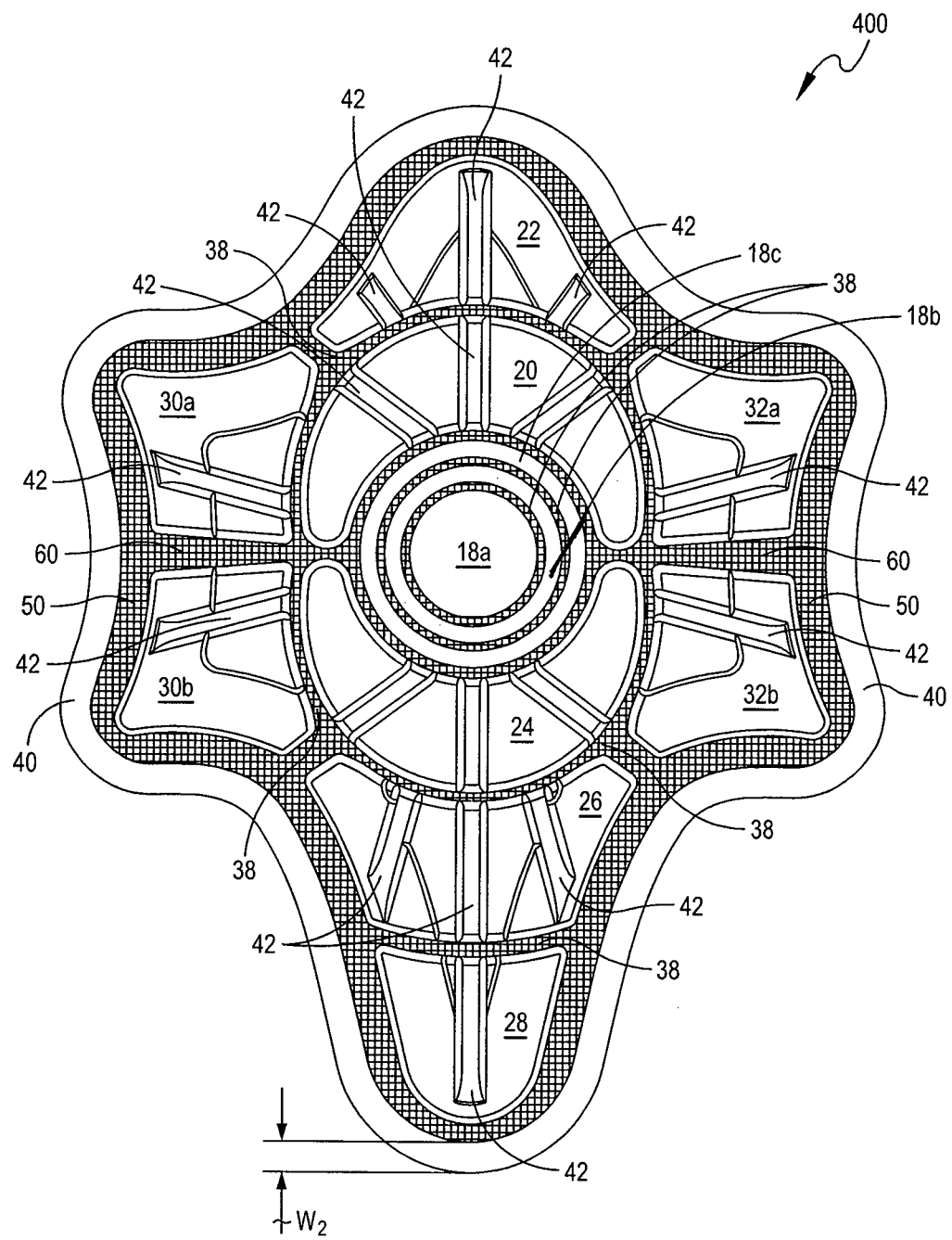
FIG. 10 is a top view of another exemplary cushioning pad according to the present disclosure.
Figure 11:
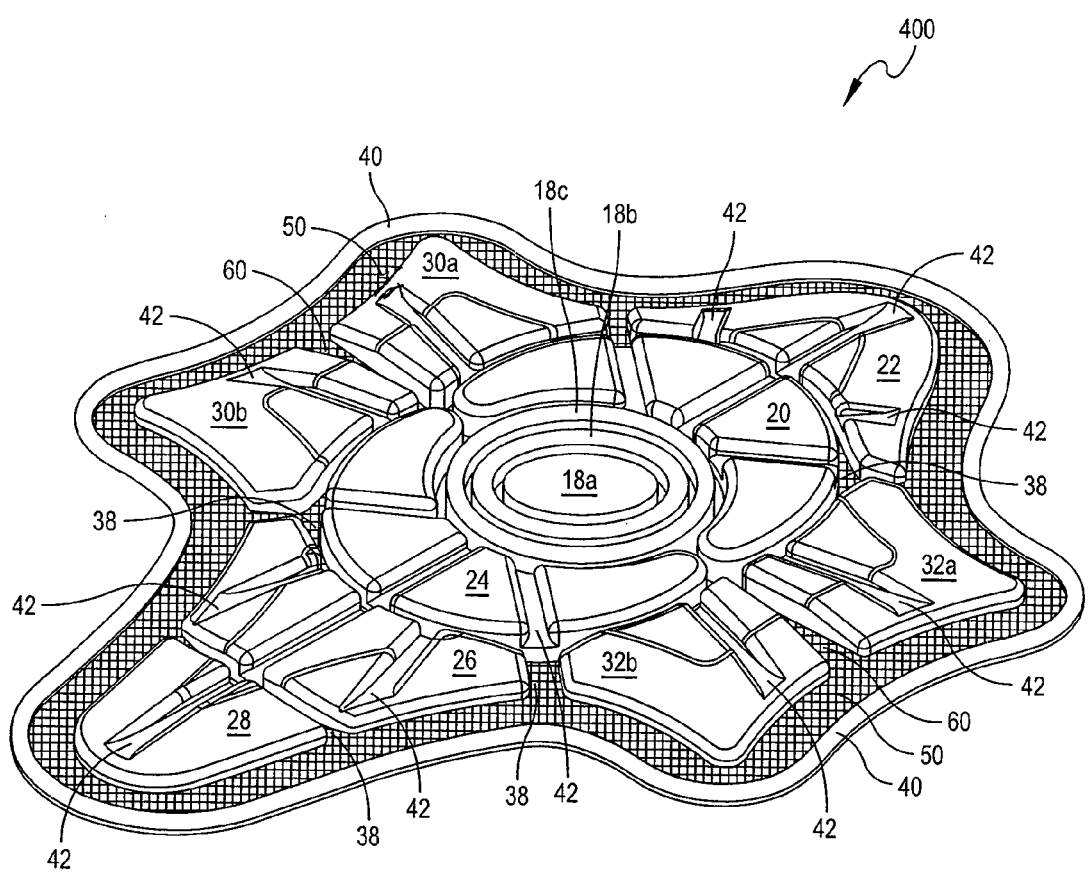
FIG. 11 is a perspective view of the cushioning pad of FIG. 10.

Another exemplary cushioning pad 400 according to the present disclosure is illustrated in FIGS. 10-11, when taken together. Pad 400 is similar in construction to pad 300, and additionally comprises two concentric hinges 38a,b, defining concentric medallions 18b,c disposed around a center medallion 18a. Like hinges 38,50,60, the addition of concentric hinges 38a,b increases the capability of pad 300 to bend, flex, fold and twist in a variety of directions, particularly in the elbow joint region.

The size, shape, configuration, orientation and dimensions of the pad, medallions, medallion contours, hinges, grooves and flange may be varied as desired in order to achieve the desired characteristics for the pad design. All of the foregoing features, alone or in combination, are designed to facilitate the flexibility of the pad either inwardly or outwardly to conform to a user's body during movement. However, it should be understood that in each of the foregoing embodiments, and in any pad according to the present disclosure, all of the foregoing measurements can vary depending on the desired characteristics and design of the pad. For example, the pads are designed to provide a variety of characteristics such as, but not limited to, cushioning, vibration dampening and/or impact absorption, and the like. The characteristics of the pad may be varied by changing the thickness and/or material type of cushioning layer 15 in the medallions, changing the spacing between the medallions (i.e., the width of the hinges), and/or changing the contours of the medallions, and the like. For example, using a gel for cushioning layer 15 provides a pad with cushioning and vibration dampening characteristics; using a foam decreases the weight of the pad; using a rate dependent or impact absorbing foam increases the impact absorption of the pad; etc. In general, increasing the thickness of the cushioning layer 15 in the medallions generally increases the foregoing characteristics; and using a combination of materials for cushioning layer 15 may provide a combination of characteristics.

In each of the foregoing embodiments, and in any pad according to the present disclosure, the hinges are designed provide flexibility to the pad in targeted areas in which flexibility is desired or needed. Using curved, parallel and/or intersecting hinges allows the flexibility of the pad to be tailored to specific functions, such as protecting joints during motion. The width, depth, orientation and position of the hinges may vary, depending on a number of factors including, but not limited to, the desired amount and location of flexibility for the pad.

The flexibility of the hinges can be varied, by varying the thickness of the material in the hinge regions. For example, decreasing the thickness of the material in the hinges increases the flexibility of the pad, and increasing the thickness of the material in the hinge regions decreases the flexibility. In some embodiments that include one or both of the inner and outer layers 16,17, it is possible to "squeeze" the cushioning layer 15 in the hinges to minimize or eliminate the amount of material in the hinge region. In such embodiments, maximum flexibility can be achieved when the thickness of the cushioning layer 15 approaches zero in the hinges, or when the pad is molded without cushioning layer 15 in the hinges 38. For example, when using inner and outer layers 16,17 with thicknesses of about 4 mils, it is possible to achieve hinge thicknesses approaching 8 mils, or approaching the combined thickness of the inner and outer layers 16,17, by removing as much cushioning material 15 from the hinge area, as is possible during the molding process.

Thus, maximum protection may be achieved using a hinge depth of less than about 20% of the medallion thickness, more particularly less than about 10% of the medallion thickness, and more particularly still less than about 5% of the medallion thickness. Successful parts have been made with hinge depths of 0.020", 0.040" and up to 0.080".

When the pads are molded with a front layer, a back layer, or both layers, the maximum pad flexibility may be achieved when the hinge thickness approximately corresponds to the combined thickness of the layer(s) other than layer 15, or when the thickness of the cushioning layer 15 approaches zero.

Deep hinges can also have some foam thickness, and still provide great mobility. As noted below, one feature of the present protective pads is that the outer and/or inner layers can protect the cushioning layer from breaking at the relatively thin hinge regions during repetitive flexing, so the foam thickness is not limited by the foam flex strength, as long as the foam is bonded to either or both inner and outer layers.

In each of the foregoing embodiments, and in any pad according to the present disclosure, the width of the hinges, or spacing between the medallions, is designed allow the pad to bend as much as possible, while still retaining the protective characteristics of the medallions. Therefore, the spacing between the medallions can be determined by the amount of distance needed to have a flexible hinge, without exposing too much space between the medallions, such that injuries would occur when the gap between the medallions is impacted. Thus, maximum protection may be achieved using a hinge width of less than about 20% of the medallion thickness, more particularly less than about 10% of the medallion thickness, and more particularly still less than about 5% of the medallion thickness. As noted above, the use of angled or saw-toothed shaped hinges and/or grooves (not illustrated) can also reduce the amount of exposed unprotected surface.

In each of the foregoing embodiments, and in any pad according to the present disclosure, the grooves 42 are designed allow the pad to bend in targeted areas. The width, depth, orientation and position of the grooves 42 may vary, again depending on a number of factors including, but not limited to, the desired amount of bending for the pad and/or medallion in which the groove is formed. The grooves 42 are designed to be thicker than the hinge areas, but thinner than the medallions, at the thickest point of the medallions. Thus, groove thickness can range from about 10 percent (%) to 95% of the medallion thickness, about 20% to about 75% of the medallion thickness, and more particularly still about 50% of the medallion thickness.

As noted above, the outer and inner layers 16,17 are optional, but they may be desirable for many reasons, particularly when the cushioning layer 15 is a cellular material, and/or is a material that does not easily retain its shape.

For example, in the embodiments described above, both the outer and inner layers 16,17 are continuously bonded to cushioning layer 15 across the entire pads, including in the hinges. Depending on the construction of the pad, the outer and inner layers may be bonded to cushioning layer 15, or they may be bonded to each other, when the amount of material in the hinges is minimized or eliminated. One significant advantage of bonding the front layer to cushioning layer 15 is to provide a continuous, uninterrupted surface above and below cushioning layer 15 i.e., to encapsulate cushioning layer 15, other than at the perimeter of the pad. The continuous upper and lower layers strengthen the hinge and groove areas, minimizing breakage in the hinges and/or grooves, which may otherwise occur due to the flexing of the pad during use, because the hinges and/or grooves are thinner than the medallions. At least one bonded layer may be used for the protection of the thin hinge areas during flexing. A thermoplastic polyurethane film, when used as the outer layer 16, is particularly good at preventing cracking or breaking of layer 17 in the hinges or grooves. The inner layer can also provide strength to the hinges or grooves if bonded to the foam, or in many embodiments, both inner and outer layers are bonded to the foam. In cases where the hinge thickness is very low, especially with little or no film in the hinge, both inner and outer bonded layers are desirable to maintain the structural integrity of the pads. It is desirable to use a material with substantial elasticity for the inner and outer layers, such as TPE films, spandex fabrics, and the like. In some embodiments, the use of a fabric with a laminated film backing may be desirable as an inside or outside layer. An inner layer that is a laminate of a fabric and a film, such as a polyurethane film laminate, can be very desirable for maximizing the durability of the hinges.

As described above, another aspect of the present disclosure is the integration of the above-described pad into garments, particularly compression garments, to protect specific areas of the body. When one of the foregoing pads is integrated into a compression sleeve or garment that is tightly fitting to the wearer, the hinged and/or grooved multilayer pad structure is sewn, adhered or otherwise attached to a spandex fabric or otherwise stretchable material in such a way that the hinged pads are held in form fitting contact with the area to be protected. The pad can be sewn to the inside or outside of a garment. It may be desirable to have the pad cover only a portion of the full circumference of the sleeve, so that the sleeve can still stretch significantly to fit the wearer. The integration of the uniquely hinged protective pad with the compression garment offers particular synergies by creating a simple way to add a significant impact absorbing pad to specific body areas, without altering the entire garment.

Figure 12:
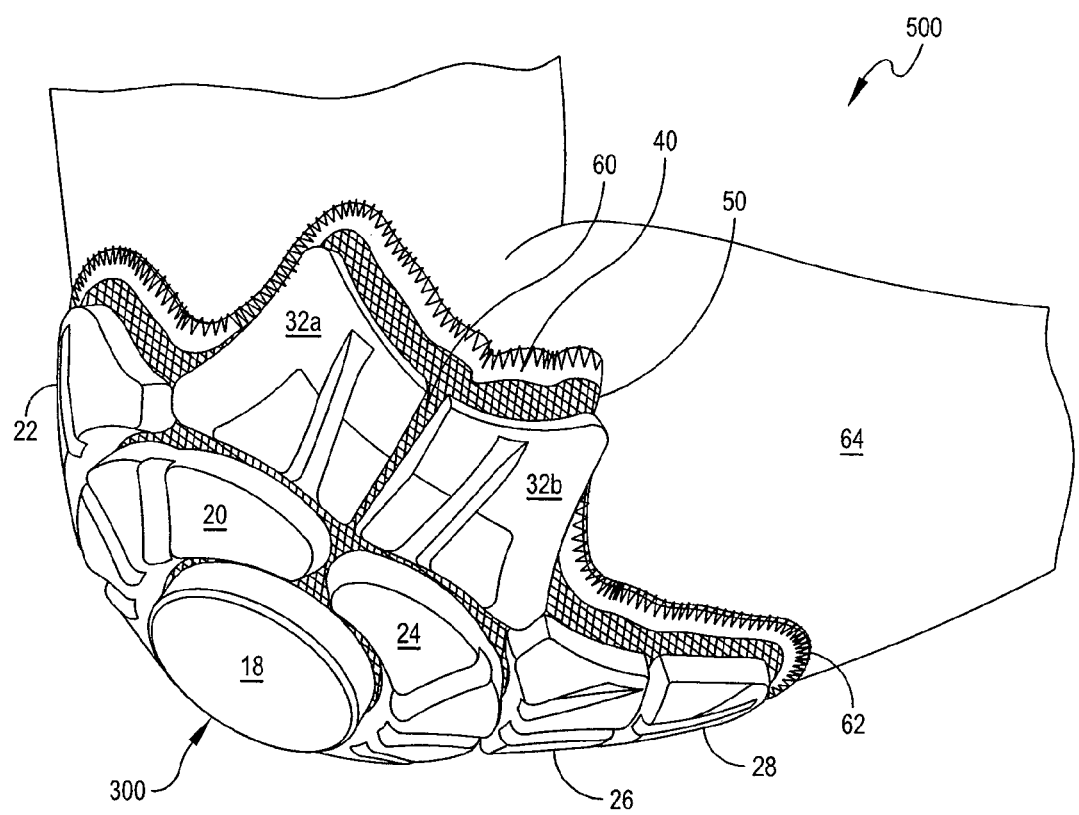
FIG. 12 shows a partial view of a user wearing a compression sleeve in which the cushioning pad of FIG. 7 has been integrated, and showing the conformance of the cushioning pad to the elbow when the elbow is articulated.

FIG. 12 shows a compression sleeve 500 comprising a cushioning pad 300, attached to the body 64 of the sleeve 500. As shown, the pad 300 is attached to the sleeve 500 by stitching the perimeter flange 40 to the body 64 of the sleeve 500, such that in use, the position of the center medallion 18 corresponds to the user's elbow. In use, when the user's arm is bent, the combination of the flexible hinges 38 and grooves 42 allow the pad to conform to the bent configuration of the user's arm, while maintaining the position of center medallion 18 relative to the elbow.

When the pad is integrated with a compression sleeve, some unique properties and advantages are provided in comparison to other methods of protecting moving joints. When integrated into a compression sleeve, the pad can be in continuous intimate contact with the joint to be protected, which may be desirable when protecting flexible joints such as knees, elbows, shoulders and ankles, because properly designed hinges allow the protective sleeves to naturally remain in the correct position and orientation. When hinges are properly designed, the protective compression sleeve moves as one with the arm, allowing much wider range of motion than traditional padding.

Also, with the protective sleeve in intimate contact with the joint and skin, there is no additional impact caused by the pad hitting the skin or joint after impact from an outside object. Stiffer pads may not be capable of being in continuous contact with the specific body area or joint, because they are not flexible or form-fitting. If not form-fitted, the pads may become part of the impact that injures the wearer. Pads in a sleeve configuration are uniquely better able to protect a moving joint, because they can wrap around a wide radius, and in some instances provide 360 degrees of protection by wrapping the entire joint. In general, it is desirable to leave some area of the compression sleeve without the additional padding layers, to allow the sleeve to stretch and conform better to the arm.

Figure 13:
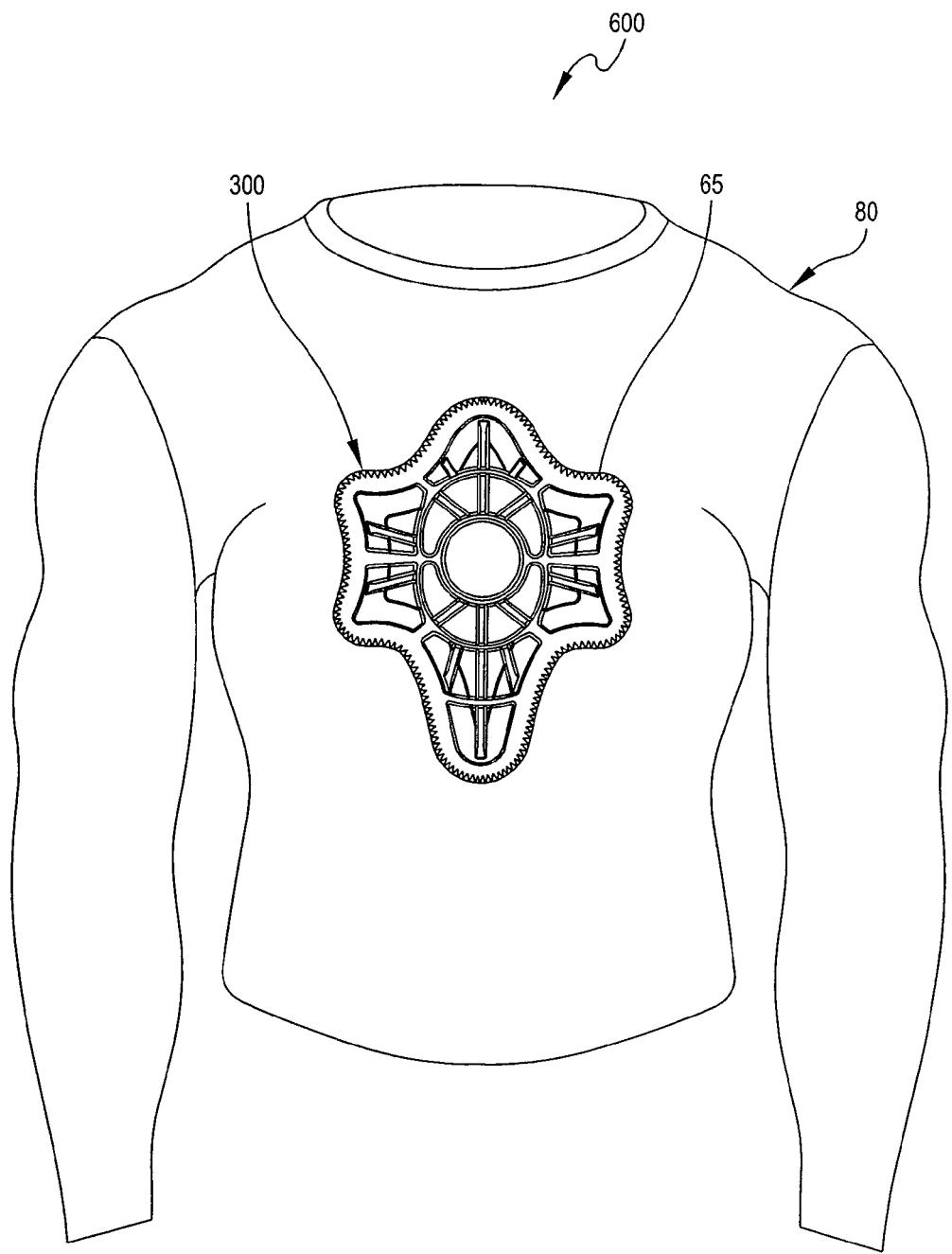
FIG. 13 is a front view of a compression t-shirt in which the cushioning pad of FIG. 7 has been integrated.

FIG. 13 shows a compression shirt 600 comprising a cushioning pad 300, attached to the body 80 of the shirt 600. As shown, the pad 300 is attached to the shirt 600 by stitching the perimeter flange 40 to the body 80 of the shirt 500, such that the position of the center medallion 18 corresponds to the center of the user's chest. In use, the combination of the flexible hinges 38 and grooves 42 allow the pad 300 to conform to the user's chest region, maintaining the pad 300 in close proximity to the user body, thereby maximizing the impact-absorption capability of the pad 300 when the user is subject to an impact in the chest region.

The garments can also be made from a wicking fabric that is designed to move moisture away from the skin layer.

The present pads also may be designed to enhance air and/or moisture transmission, without significantly compromising protection, which is not an option with other protective padding. The hinges, grooves and/or medallions may comprise perforations (not illustrated), which enhances moisture or air transmission rates. The use of a wicking fabric as the inner layer or in combination with a TPE film layer as the inner layer, can enhance comfort as well as wick moisture through the hinges. Also, the use of a high moisture vapor transmissive ("MVT") film layer can further enhance comfort. Such films can function by chemical absorption/desorption. Examples of such films are available under the product name Sympatex, or TX1540 from Omniflex. The use of microporous high MVT films such as Goretex or Porelle (by Porvair) can also be used, or other similar films.

In some embodiments, the pads may be formed such that the foam has a generally uniform density throughout the pad. Specifically, in some instances it may be desirable not to compress the foam in the grooves or hinges during molding or forming, because the compression increases the density of the foam, which tends to reduce the range of motion and provide non-uniform padding levels by eliminating foam. The contoured medallions and variations in foam thickness not only provide an aesthetically pleasing pad, but they also provide maximal protection where protection is most needed, and less protection where less is needed. By using uniform foam density and varying thickness where needed, the weight of the pad is reduced, and the range of motion is increased. Using thermoforming or compression to take foam and compress areas to shape may increase density in those areas and create additional weight, uneven protection and less range of motion.

The present pads may be manufactured using techniques disclosed in U.S. Pat. No. 7,827,704 and U.S. Publication Nos. US 2008/0034614 and US 2009/0255625, which are incorporated herein by reference in their entirety. The molds for the present pads are designed to allow layers 15,16,17 to be compressed together under conditions sufficient to minimize or eliminate the foam in the hinges 38,50,60, for certain embodiments of the pads, while allowing the layers to bond together, which may be a chemical, thermal and/or mechanical bond.

The pad construction, with inner and outer film layers, allow the manufacturer to make the gaps between sections of the pad smaller, because it is not necessary to use fabric to locate and position the pad. It also allows the manufacturer to angle and shape these grooves and hinges in the most appropriate way to cover and protect the wearer fully while stretching, fitting, and remaining in place during the activity.

The ability to create an exposed protective foam pad, in contrast to a pad enclosed in a pocket, enclosed in fabric or flexible film provides a unique and critical ability to offer protection for individuals wearing supportive or corrective braces, such as knee braces, ankle supports, back supports, and the like. Thus, the pads can be attached or adhered to mechanical supports to protect adaptive mobility athletes from themselves and from other athletes with similar braces. Similarly, the design of pads according to the present disclosure can be customized and adhered to braces worn by conventionally mobile athletes. This provides protection to both the wearer of the brace but also other athletes who come in contact with the corrective brace. One example of such a brace is the padding on knee braces used in professional football.

The present pads can also be used on shin guards worn by youth, adult and professional soccer players. The properties of impact absorbing foam padding in combination with form fitting garments provides unique and highly accurate protection of targeted body parts. Therefore, one embodiment of this disclosure is flexible, form-fitting breathable shin and ankle guards for soccer players. Significantly, such shin and ankle guards provide more protection to soccer players due to the closer fit of the foam, more comfort from the wicking materials, venting and perforation used in construction, and a more durable product than, for example, non-breathable, hard plastic pad held in place with straps or friction of the user's sock.

The foam padding and other layers as noted earlier can be designed with perforations either throughout the material, or within the groove or hinge areas, without significant deterioration of the protection. The fact that all layers of the pad are continuously bonded together, in some embodiments, allows the transpiration of water vapor to pass more easily through pre-established pathways. Once the moisture is wicked into the fabric layer, it can be channeled out through the pads because the surfaces are bonded. This is an important distinction from other pads, which have one or more of the layers free floating, making them more uncomfortable to wear.

Pads comprising continuous inner and outer layers that are bonded to cushioning layer 15 in the medallions, hinges and grooves, provide free range of motion and a durable pad, because it allows the pad to flex and hinge along with the specific area of the body without degradation. The fact that the pad has a continuous inner surface, outer surface or both, maintains the orientation and position of the hinges, as well as the spacing. The present pads are in contrast to pads and garments in which foam has been cut, scored, or molded in separate pieces, to form the hinges, which can allow too much stretch between the pads and allow injury to the user. The present protective pads allow the fixed orientation of the pads. This feature may be less desirable for application in which significantly moving joint areas are not being protected, and are just making generalized shirt or pant padding.

The integration of the pad into a compression or form-fitting garment allows protection to specific areas of the body including joints; the protection is not just from outside impact. Use of such compression or form-fitting garments with the present pads keeps the pad from separating from the skin prior to impact, which may cause secondary impact to the body.

In certain embodiments, the fact that the outside surface (fabric or film) is (in some embodiments) the actual outside surface of the garment or sleeve, is an important distinction. Pads that have unbonded fabric or other covering sewn across the outside, covering the padding, allow slippage of the outer layer across the padding on impact, which affects the precision of the impact protection. When wearing the current garments, the wearer has the pad on the exterior of a form-fitted garment, and enjoys more accurate protection of the specific body area or joint. Having the exposed outer layer of the present disclosure pad as the outside layer of the garment or sleeve (as shown in FIGS. 12 and 13), also allows improved moisture or air flow management, which is superior to cut foam pieces with any form of loose cover.

Precision air channels and perforations in some embodiments allows less heat and moisture build-up. In addition, embodiments with the outside surface of the pad exposed allow for the inside of a form fitting garment to lie flat against the user's skin, as the inside surface of the pad can generally be flat. When attached to the outside of an elastic fabric, the user can have an uninterrupted layer of elastic fabric or other material against the skin. This allows the pad to closely hug the skin surface, and also to have a more seam-free interior surface which is less likely to cause abrasions or irritations to the skin.

Use of the pads exposed on the surface also provides for more ability to make hinges or grooves tighter and/or smaller because an add-on external material could otherwise block proper hinging by filling in the hinge spaces and interfering with the movement of the hinges. The grooves and hinges can also be angled and shaped in specific designs to cover and protect the subject more precisely. The creation of specific and more aerodynamic shapes can also be made on the garment surface using the present pads. The aerodynamic surface, combined with protection, can be an advantage in sports such as ski racing, in which the wearer would be protected, for example from impacts with gates, while having enhanced lower wind resistance. Other sports can benefit from improved aerodynamics, such as bike racing.

Use of the present impact absorbing pads, when exposed on the surface of a garment, allows the impact absorbing foam to react faster, because there are no unnecessary layer(s) between the foam and impact. This can be a desirable feature when using "rate dependent" impact absorbing foams, such as Poron XRD, or other such materials. These materials stiffen on impact, and the use on the exposed surface with only a single layer of bonded film or other material between foam, and the object impacting the pad allows the foams to react better and more quickly.

In some embodiments, the use of film, particularly polyester polyurethane film, as the outside layer of a pad attached to a sleeve or garment, creates a durable and more cleanable pad system. The exterior surface, with the film exposed, can be both durable and dirt resistant. Fabric as a top layer, whether sewn or otherwise attached, can rip and tear or get dirty, and in these complex garments, can be difficult to clean. Fabric and/or film that is continuously bonded as an inner or outer layer, either together in the hinge areas, or to the cushioning material in the medallions, would be more durable than unbonded sewn fabric used in many pads, in which a torn outer garment exposes the pad meant to protect the wearer to dislocation or removal from the garment. In the embodiments of the present disclosure that use a fabric layer as the inner or outer layer, a film layer inside the fabric can also minimize and/or prevent dirt or liquid from infiltrating or penetrating the foam.

The fact that the pads in many embodiments are molded with uniform density of foam padding (i.e., not higher density compressed foam) allows more precise design of the protection, and greater range of motion than varied densities caused by compression.

The present pads, clothing and methods of manufacture are advantageous for many reasons. For example, a single continuous pad with many elements provides an economic advantage over traditional pad construction techniques, by eliminating labor-intensive cutting, scoring or thermoforming that may otherwise be required for end garment construction.

The use of bonded hinges that approach zero thickness for cushioning layer 15 is very unique. In such near zero thickness hinge areas, the top surface of the outer layer is still bonded to the inner layer throughout the hinge that can allow dramatically improved range of motion in specific, selected areas. As noted, hinge areas can be anywhere from near zero thickness (less than 0.001" (1 mil) of foam) or much higher, provided that they are less than the thicker areas of cushioning material. Some embodiments have hinge areas near zero while others are at 0.010" (10 mils), 0.020" (20 mils) or even 0.080" (80 mils) or 0.120" (120 mils). The combination of both hinge and groove areas in multiple orientations allows the formation of pads that combine the full range of motion where needed, but protective padding in other areas where less flex is required.

The use of a bonded inner layer with elasticity and a bonded outer layer with elasticity is also desirable in embodiments where stretch is desired, such as when the cushioning pad is attached to a stretch garment.

Where near the thickness of the hinge areas approaches zero, or in thin hinge areas (less than 0.100" (1 mil) foam), the fact that the entire pad has a continuously bonded inner or outer layer (or both) maintains spacing and prevents separation of an unprotected area. This is in contrast to pads in which separate cut pieces are used to create the pad, because the cut pieces can separate under duress and allow the user to be exposed, and possibly injured.

In some embodiments, the use of narrow hinge spacing has proved desirable to prevent exposed areas when the joint is flexed in certain ways. The present disclosure allows very narrow hinges, or very narrow spacing between medallions, without the danger of the hinge separating during use.

Some embodiments, which are designed for joints, comprise a central medallion (e.g., center circular medallion, bulls-eye medallion, polygonal medallion, and the like), that is surrounded by concentric hinges. The center medallion can be used to properly locate and position the pad, such that the central medallion is located over the joint (e.g., elbow bone).

The flexible nature, durability and dual-film layer construction of the protective padding is suited to providing protection to individuals that wear supportive and corrective braces, including but not limited to knee braces, ankle braces and back supports.

The use of multiple levels of hinges and grooves in multiple orientations in some embodiments is both desirable and unique.

The present pads can be manufactured to provide better protection to specific body areas while being lightweight, which is a significant advantage to athletes and active individuals.

One advantage of the present protective pads is that an entire flexing region can be protected by one large pad or several large pads designed specifically for a certain part of the body, rather than smaller cut pads or strips that is sewn into a garment. The integrated large pad is both more economical, and also prevents shifting of the cut or strips of pads that would cause gaps in protection. In addition to providing better and more accurate protection than current products, the present protective pads allow the entire durable pad to be exposed, which can be both an aesthetic advantage and weight savings, and can make the pad more comfortable with better moisture or air transmission. By exposed, it is meant that it is not necessary to put the pads in pockets, or to sew the pads into pockets, where they would remain loose in the pocket. Instead, the present pads are attached directly to an underlying material by sewing.

Those of ordinary skill in the art will recognize that other methods of attachment may be used, but it has been found that sewing provides certain advantages. In contrast to heat sealing or welding, it has been found that sewing the cushioning pads in place along the perimeter flange prevents or minimizes the pads from separating from the garment, which is advantageous in comparison to pads that are loose within the garment (i.e., held loosely in pockets designed to contain the pads), or that are attached by welding, heat sealing, and the like.

In addition, exceptionally durable cushioning pads can be made according to the present disclosure, comprising inner and outer film layers, with cushioning material between the film layers, defined by hinges with a "near zero" thickness of cushioning material between the inner and outer layers, and that terminate at the outer edge with the combination of a near-zero perimeter hinge adjacent to a perimeter flange with a relatively low thickness of cushioning material disposed between the inner and outer layers. The foregoing pads are exceptional durable, and can withstand repeated commercial laundering. In such pads, when incorporated into garments, it is theorized that the thickness of the perimeter flange (e.g., about 20 mils) provides a sturdier region for stitching, which would otherwise would fray and rip without the cushioning material if unsupported by the 20 mil perimeter flange. Moreover, the perimeter flange makes a more attractive product, with a softer edge than is possible by terminating with the film at the perimeter of the cushioning pad.

It is also thought that the near-zero hinges throughout the pad allow the pad contribute to the durability of the pad during the washing cycle, because the foam material in the hinges is so thin, that a cellular structure no longer exists. Thus, the stitched perimeter flange prevents or minimizes the pad from lifting off in repeated washing, i.e., locking down the perimeter of the cushioning pad.

In addition, the continuous bonding of the inner and outer films either to the cushioning material in the medallion regions, or to each other in the hinges, prevents or minimizes the chance of fluid or other materials from getting into the pad, and of the cushioning material from escaping from the pads. In combination, both features enhance the durability of the many pads in rigorous conditions, eliminating or preventing completely the delamination of layers, as occurs in other products. It is thought that the perimeter flange and adjacent near zero hinge prevent or minimize fluid and/or particulates from infiltrating the pads beyond the perimeter flange, because the foam has been removed almost completely from the hinge area, and without the cellular structure of the foam in the hinge area, fluid and/or particulates cannot migrate past the perimeter flange. Therefore, the perimeter hinge acts as a buffer to the infiltration of fluid and/or particulates into the pad.

Similarly, the "network" of hinges throughout the cushioning pads, particularly when the hinges are "near zero" hinges, further improves the durability of the pads, because eliminating and/or minimizing the foam, or other cushioning material in the hinge area, increases the bond strength in the hinges. The bond strength is increased in the hinge area because the remaining cushioning material in the hinge areas is insufficient to support the foam structure (in the case of a foam). If foam remains in the hinges, the bond strength may be limited to the foam tear strength. Thus, when the thickness of the foam, or other cushioning material, is minimized, the bond in the hinges increases, because there are no thin foam cell walls to tear. That is, without a cellular foam structure in the hinges, there is no space for fluid and/or particulate penetration beyond the perimeter flange. As a result, if a single medallion or hinge is damaged or compromised, damage to the entire pad is minimized or compartmentalized, because the damage may extend only to the adjacent pad and/or hinge.

Another advantage of the present pads is that the combination of deep hinges and less deep grooves, or multi-level hinging, provides a protective garments with improved protection, while maintaining a significant range of motion in the protected area. The use of connected top, bottom or both layers allows for the more precise use of the hinges and grooves, and keeps the individual medallions from moving relative to one another. In addition, the integration with stretchable form-fitting garment material results in significant wrapping of the protected area and keeps the exterior pad in continuous contact with the specific area of the body.

Example 1

A cushioning pad was molded to form an elbow pad according to design shown in FIG. 1. The materials used were PORON for cushioning layer 15 (bright yellow color), a stretchable fabric (black) for inner layer 17 having a thickness of about 19 mils, and a transparent polyurethane TPE film layer 16 having a thickness of about 4 mils. After molding, measurements of combined thickness in cross-section were taken, as shown below in Table A.

TABLE A

| Location | Thickness thousands of an inch (mils) |
| --- | --- |
| Center Medallion 18 | 0.250" (250 mils) |
| Right Side Medallion 32 | 0.250" (250 mils) |
| Channels/Hinges 38 | 0.040" (40 mils) |
| Groove 42 (thinnest region) | 0.129" (129 mils) |
| Groove 42 (thickest region) | 0.141" (141 mils) |
| Perimeter flange 40 | 0.040 (40 mils) |

In this example, the mold was not designed to compress the layers during molding so as to remove the foam from the hinge area. A visual inspection of the pad shows that the front of the pad is uniformly bright yellow in color, as would be expected if foam remained in the hinge area. The resulting hinges were flexible, but not so much as to be "floppy."

Example 2

A cushioning pad was molded to form an elbow pad according to design shown in FIG. 7, using the same materials used in Example 1. After molding, measurements of combined thickness in cross-section were taken, as shown below in Table B.

TABLE B

| Location | Thickness thousands of an inch (mils) |
| --- | --- |
| Center Medallion 18 | 0.250" (250 mils) |
| Right Side Medallion 32 | 0.250" (250 mils) |
| Groove 42 (thinnest region) | 0.129" (129 mil) |
| Groove 42 (thickest region) | 0.141" (141 mils) |
| Hinges 38, 50 | 0.023" (23 mils) |
| Perimeter flange 40 | 0.040" (40 mils) |

In this example, the mold was designed to compress the material in the hinge regions during molding so as to eliminate or minimize the amount of foam (in cushioning layer 15) from the hinge areas. A visual inspection of the pad shows that the medallions and flange were uniformly bright yellow in color, as would be expected if foam remained in those areas, whereas the hinges were uniformly black, as would be expected if as much foam as possible was removed or squeezed from the hinge areas during manufacture. The resulting hinges were extremely flexible, so much so that the pad was "floppy" at the hinges, and foldable by about 180 degrees at the hinges. In general there are many important distinctions between the present disclosure and any prior art, but some of the important ones are as follows:

It should be noted that the terms "first," "second," and the like herein do not denote any order or importance, but rather are used to distinguish one element from another, and the terms "a" and "an" herein do not denote a limitation of quantity, but rather denote the presence of at least one of the referenced items. Similarly, it is noted that the terms "bottom" and "top" are used herein, unless otherwise noted, merely for convenience of description, and are not limited to any one position or spatial orientation. In addition, the modifier "about" used in connection with a quantity is inclusive of the stated value and has the meaning dictated by the context (e.g., includes the degree of error associated with measurement of the particular quantity).

Compounds are described herein using standard nomenclature. For example, any position not substituted by an indicated group is understood to have its valency filled by a bond as indicated, or a hydrogen atom A dash ("-") that is not between two letters or symbols is used to indicate a point of attachment for a substituent. For example, —CHO is attached through the carbon of the carbonyl group. Unless defined otherwise herein, all percentages herein mean weight percent ("wt. %"). Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," are inclusive of the endpoints and all intermediate values of the ranges, e.g., "about 5 wt. % to about 25 wt. %, about 5 wt. % to about 15 wt. %", etc.). The notation "+/−10%" means that the indicated measurement may be from an amount that is minus 10% to an amount that is plus 10% of the stated value.

Finally, unless defined otherwise, technical and scientific terms used herein have the same meaning as is commonly understood by one of skill in the art to which this disclosure belongs.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A cushioning pad comprising:
a continuous upper layer, a continuous lower layer and a continuous cushioning layer of a polymeric cushioning material disposed between the continuous upper layer and the continuous lower layer;
a first cushioning region having a boundary;
one or more second cushioning regions being positioned around the boundary of the first cushioning region in a fixed relation thereto and surrounding the first cushioning region;
wherein the polymeric cushioning material is disposed in the first cushioning region and the one or more second cushioning regions; and
one or more grooves between the first cushioning region and the one or more second cushioning regions, wherein a thickness of the one or more grooves is less than a thickness of the first cushioning region and the one or more second cushioning regions, the one or more grooves enabling radial articulation of the one or more second cushioning regions relative to the first cushioning region, while preserving the fixed relation between the first cushioning region and the second cushioning regions.

2. The cushioning pad of claim 1 wherein the continuous upper layer and the continuous lower layer is at least partially bonded to the continuous upper layer.

3. The cushioning pad of claim 2 wherein at least one groove of the one or more grooves comprises a direct bond between the upper layer and the lower layer to encapsulate the polymeric cushioning material.

4. The cushioning pad of claim 1 wherein the polymeric cushioning material is further disposed in the one or more grooves, and wherein a thickness of the polymeric cushioning material disposed in the one or more grooves is less than a thickness of the polymeric cushioning material in the first cushioning region and the one or more second cushioning regions.

5. The cushioning pad of claim 2, wherein a continuous bond is formed between the upper layer and the lower layer to encapsulate the polymeric cushioning material.

6. The cushioning pad of claim 1 wherein the first cushioning region comprises a central medallion and a first crescent-shaped medallion disposed adjacent to the central medallion on a first side of the central medallion and a second crescent-shaped medallion disposed adjacent to the central medallion in opposition to the first crescent-shaped medallion.

7. The cushioning pad of claim 6 wherein the first crescent-shaped medallion and the second crescent-shaped medallion are separated from the central medallion and from one another by one or more grooves.

8. The cushioning pad of claim 1 wherein the first cushioning region comprises a central medallion and one or more concentric medallions concentrically disposed around the central medallion.

9. The cushioning pad of claim 8 wherein the central medallion and one or more concentric medallions are separated by one or more concentric grooves.

10. The cushioning pad of claim 1 wherein the first cushioning region and the one or more second cushioning regions comprise a plurality of cushioning medallions spaced apart from one another, wherein each of the cushioning medallions has a shape that is different than at least one other adjacent cushioning medallion.

11. The cushioning pad of claim 1 wherein the first cushioning region comprises a polygonal medallion and the one or more second cushioning regions comprise a plurality of second cushioning medallions, wherein each of the second cushioning medallions has a shape that is different than at least one other second adjacent cushioning medallion.

12. The cushioning pad of claim 1 further comprising an elongated body and opposing lateral extensions on each side of the elongated body, wherein the one or more grooves enable the to lateral extensions to flex forward and backwards relative to the elongated body.

13. The cushioning pad of claim 4 wherein the one or more grooves comprise a combination of curved grooves and linear grooves.

14. A cushioning pad comprising:
a continuous upper layer and a continuous lower layer;
an elongated body and opposing lateral extensions on each side of the elongated body;
a first cushioning region disposed along the elongated body;
second cushioning regions disposed along the lateral extensions,
wherein a cushioning layer of a polymeric cushioning material is disposed between the continuous upper layer and the continuous lower layer in the first cushioning region and the second cushioning regions, and
wherein the polymeric cushioning material is bonded to the continuous upper layer and the continuous lower layer; and
one or more grooves defining a predetermined spacing between the first cushioning regions and the one or more second cushioning regions, the one or more grooves enabling articulation of the lateral extensions relative to the elongated body.

15. The cushioning pad of claim 14 wherein the first cushioning region comprises multiple first cushioning medallions separated from one another by one or more first grooves.

16. The cushioning pad of claim 15 wherein each of the second cushioning regions comprises multiple second cushioning medallions having different shapes and being separated from one another by one or more second grooves.

17. The cushioning pad of claim 14 wherein the first cushioning region comprises multiple cushioning medallions, wherein each of the cushioning medallions has a shape that is different than at least one other adjacent cushioning medallion.

18. The cushioning pad of claim 14 wherein the one or more grooves comprise a combination of curved grooves and linear grooves.

19. The cushioning pad of claim 14 wherein the polymeric cushioning material is further disposed in the one or more grooves, wherein a thickness of the polymeric cushioning material disposed in the one or more grooves is less than a thickness of the polymeric cushioning material in the first cushioning region and the one or more second cushioning regions.

20. The cushioning pad of claim 14 wherein at least one groove of the one or more grooves comprises a direct bond between the upper layer and the lower layer to enable the pad to flex forward and backwards.

21. The cushioning pad of claim 14 wherein a continuous bond is formed between the upper layer and the lower layer to encapsulate the polymeric cushioning material.

22. A cushioning pad comprising:
a continuous upper layer, a continuous lower layer and a cushioning layer disposed between and bonded to the upper layer and the lower layer;
wherein the upper layer, the cushioning layer and the lower layer have a shape, size and configuration adapted to contours of a joint;
the cushioning layer being disposed in a first cushioning region shaped to be positioned over the joint, and a second cushioning region positioned between the first cushioning region and a perimeter of the pad in fixed relation thereto and surrounding the first cushioning region,
wherein the second cushioning region is spaced away from the first cushioning region by one or more first grooves to enable radial articulation of the second cushioning region relative to the first cushioning region.

23. The cushioning pad of claim 22 wherein the second cushioning regions comprise a plurality of cushioning medallions, wherein each of the cushioning medallions has a shape that is different than at least one other cushioning medallion adjacent to it.

24. The cushioning pad of claim 22 wherein the one or more first grooves comprise a combination of curved grooves and linear grooves.

25. The cushioning pad of claim 22, wherein a continuous bond is formed between the upper layer and the lower layer to encapsulate the cushioning layer.

26. The cushioning pad of claim 22 wherein the cushioning layer is further disposed in the one or more first grooves.

27. A cushioning pad comprising:
an elongated body and opposing lateral extensions on each side of the elongated body;
an upper layer, a lower layer and a cushioning layer disposed between and bonded to the upper layer and the lower layer, wherein the upper layer, the cushioning layer and the lower layer have a shape, size and configuration adapted to contours of a joint;
the cushioning layer being disposed in a first cushioning region disposed on the elongated body and in second cushioning regions disposed on the lateral extensions;
one or more grooves between the first cushioning regions and the one or more second cushioning regions, the one or more first grooves enabling articulation of the lateral extensions relative to the elongated body; and
a perimeter flange positioned along the perimeter of the pad.

28. The cushioning pad of claim 27, wherein the perimeter flange is separated from the second cushioning regions by a perimeter hinge, the perimeter hinge having a thickness equal to the combined thickness of the inner layer and the outer layer.

29. The cushioning pad of claim 22 wherein the first cushioning region includes one or more second grooves defined in an upper surface of the first cushioning region, the one or more second grooves having a thickness which is greater than a thickness of the one or more first grooves.

30. The cushioning pad of claim 27 wherein the first cushioning region comprises a cushioning medallion with one or more second grooves defined in an upper surface of the cushioning medallion, the one or more second grooves having a second thickness, which is greater than a thickness of the one or more first grooves.

* * * * *